(12) United States Patent  
Dillon

(10) Patent No.: US 6,604,351 B2
(45) Date of Patent: Aug. 12, 2003

(54) JOINT FOR AN ARTICULATED VEHICLE

(76) Inventor: Ben N. Dillon, 206 Greensprings Dr., Columbus, OH (US) 43235

( * ) Notice: Subject to any disclaimer, the term of this patent is extended or adjusted under 35 U.S.C. 154(b) by 30 days.

(21) Appl. No.: 09/960,081

(22) Filed: Sep. 21, 2001

(65) Prior Publication Data

US 2002/0014062 A1 Feb. 7, 2002

Related U.S. Application Data

(62) Division of application No. 09/575,519, filed on May 22, 2000, now Pat. No. 6,339,917, which is a continuation-in-part of application No. 09/481,046, filed on Jan. 11, 2000, now Pat. No. 6,125,618, which is a division of application No. 09/040,985, filed on Mar. 18, 1998, now Pat. No. 6,012,272.

(51) Int. Cl.[7] ........................... A01D 34/00; B62D 11/00
(52) U.S. Cl. ........................................ 56/14.6; 180/418
(58) Field of Search ................................ 56/14.6, 13.6, 56/16.2; 180/418, 419, 420, 14.1, 14.4, 235; 280/504, 468, 442, 467, 484, 482, 490.1, 124.11, 112, 116

(56) References Cited

U.S. PATENT DOCUMENTS

| | | | | |
|---|---|---|---|---|
| 5,180,028 A | * | 1/1993 | Perrenoud, Jr. | ............. 180/235 |
| 5,725,063 A | * | 3/1998 | Ceragioli et al. | .......... 180/14.4 |
| 5,873,431 A | * | 2/1999 | Butler et al. | ................. 180/418 |
| 5,899,292 A | * | 5/1999 | Paul et al. | ................... 180/419 |
| 5,908,081 A | * | 6/1999 | Olson | .......................... 180/419 |
| 6,206,118 B1 | * | 3/2001 | Menze et al. | ............... 180/14.1 |

\* cited by examiner

*Primary Examiner*—Robert E. Pezzuto
(74) *Attorney, Agent, or Firm*—Mueller and Smith, LPA

(57) ABSTRACT

The present invention is addressed to a joint which includes an upper frame member carried by the forward unit and having a recess on its lower side and a lower frame member carried by the forward unit, having a recess on its upper side, and being spaced-apart vertically below the upper frame member so that the recesses are in vertical registration. The joint further includes a shaft carried by the rearward unit and a bearing retainer assembly carried by the end of the shaft and disposed between the recesses. The bearing assembly includes an annulus surmounting a hub connected to the shaft. Thrust bearings between the annulus and hub permit the hub to co-rotate with the shaft with respect to the annulus, while nibs carried by the annulus are associated with tapered roller bearings so that the outer annulus co-twists with the shaft respect to the forward unit.

6 Claims, 21 Drawing Sheets

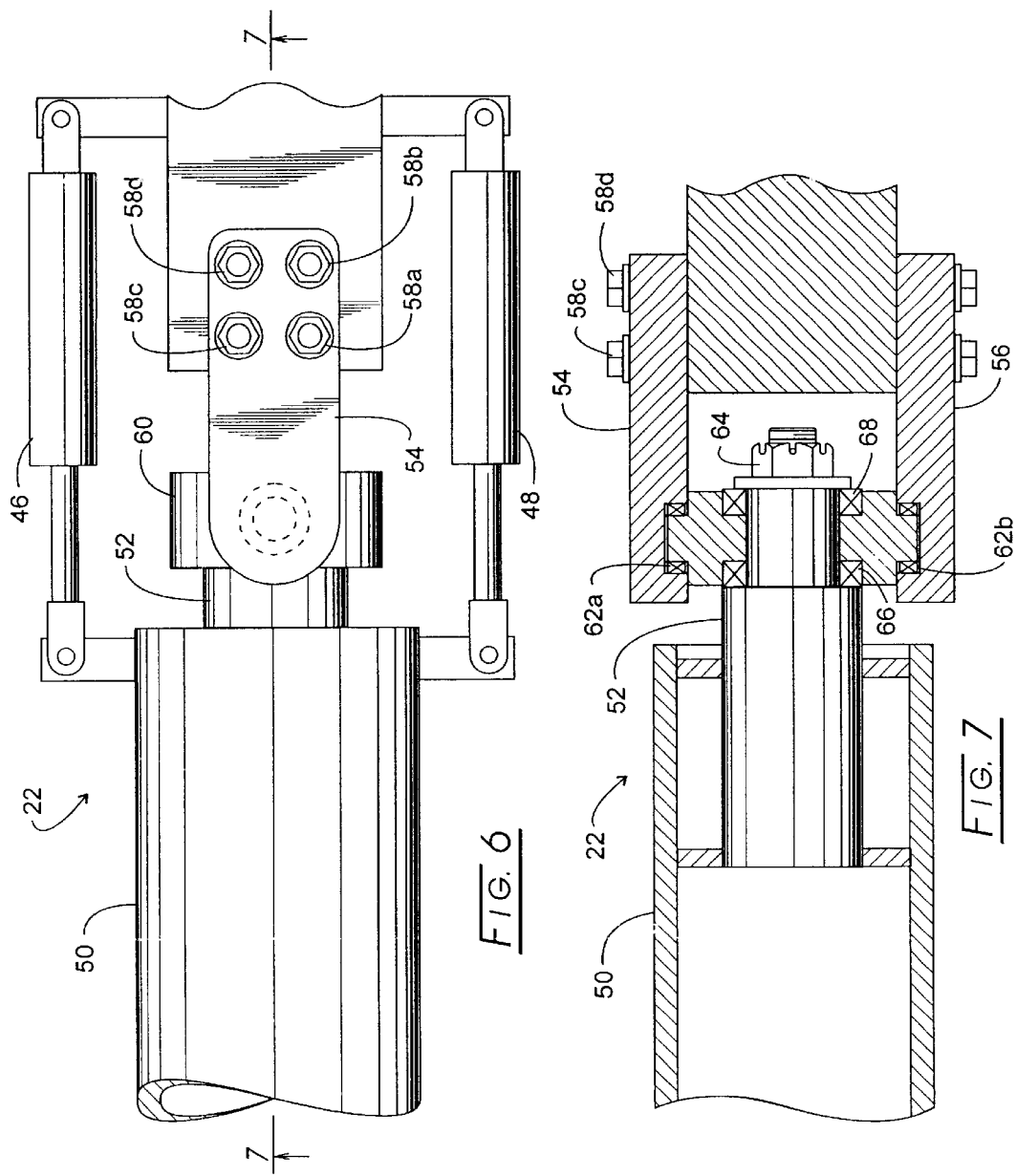

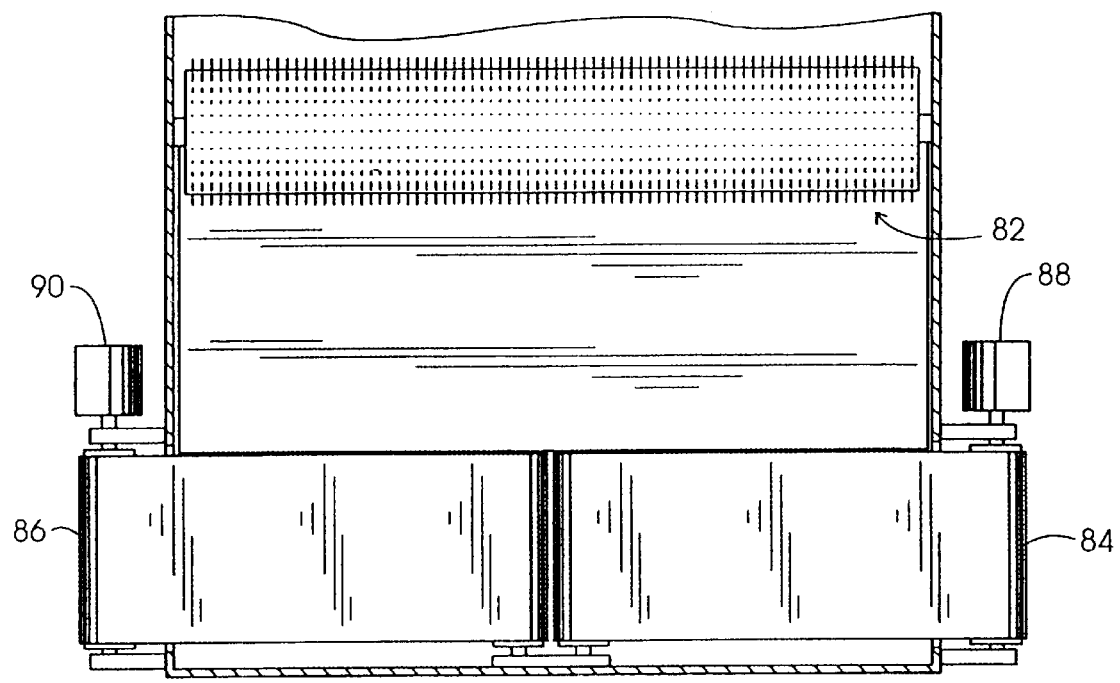
FIG. 10
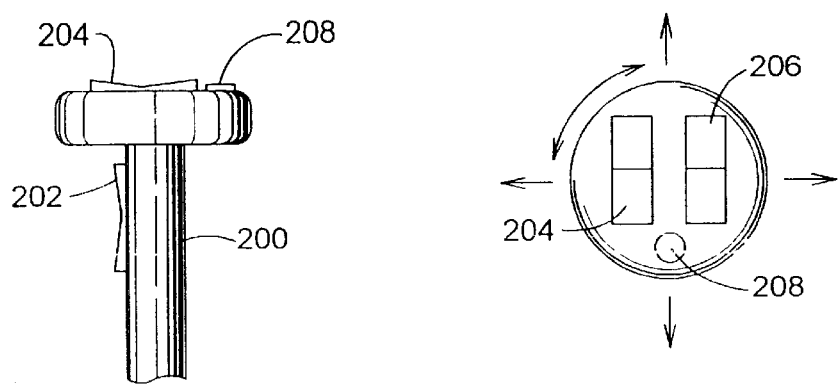
FIG. 15
FIG. 16

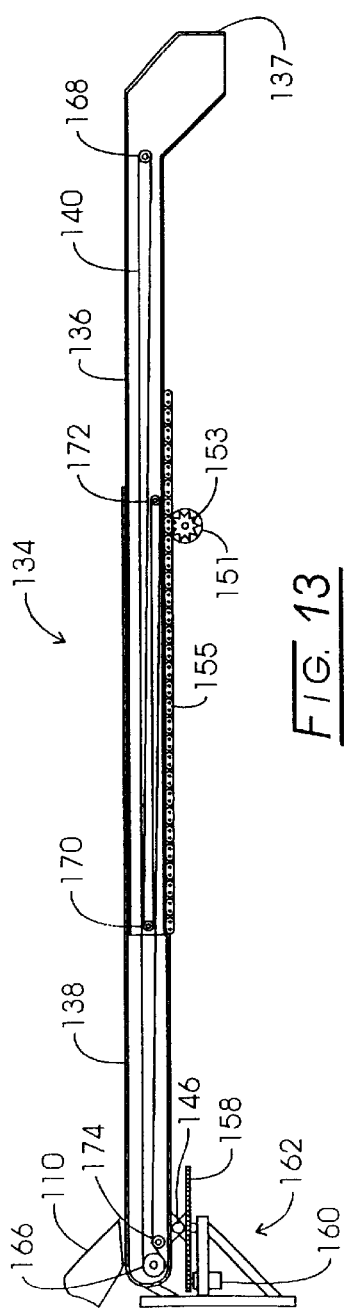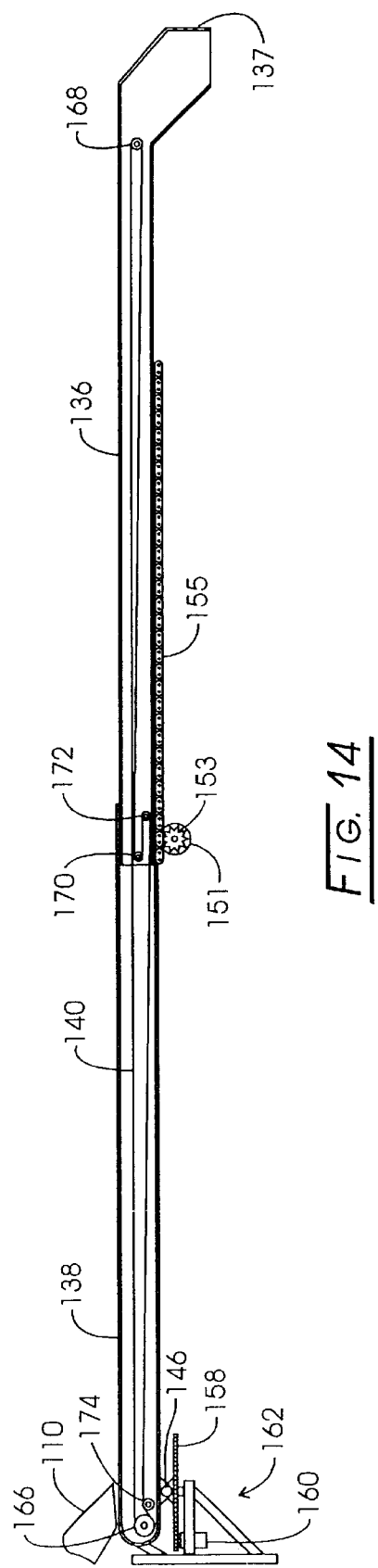

JOINT FOR AN ARTICULATED VEHICLE

CROSS-REFERENCE TO RELATED APPLICATIONS

This application is a divisional application of application Ser. No. 09/575,519, filed May 22, 2000, now U.S. Pat. No. 6,339,917; which is a continuation-in-part of application Ser. No. 09/481,046, filed Jan. 11, 2000, now U.S. Pat. No. 6,125,618; which is a divisional application of application Ser. No. 09/040,985, filed Mar. 18, 1998, now U.S. Pat. No. 6,012,272; and is cross referenced to application Ser. No. 09/210,331, filed Dec. 11, 1998, now U.S. Pat. No. 6,167,982.

STATEMENT REGARDING FEDERALLY SPONSORED RESEARCH

Not applicable.

BACKGROUND OF THE INVENTION

The present invention generally relates to combines and more particularly to an articulated (jointed) combine which employs, *inter alia,* an improved joint, unloading capability, grain transfer capability, airbag suspension, straw and chaff conveyor, suspended/movable fuel tank, control/steering, and extremely large grain storage capacity.

A modern agricultural combine typically unloads or transfer clean grain from its on-board storage hopper utilizing an auger of fixed length which swings out in a fixed radius and fixed elevation arc from its stowed position. The stowed position generally is pointing to the rear of the combine. The auger in turn generally is driven by a mechanical arrangement of belts, chains, clutch, and gearbox. The unload auger in most combine designs swings out to the operator's left. The auger length generally is limited by the practical distance that it can extend beyond the rear of the combine in its stowed position without creating a serious maneuvering hazard.

As the size of on-board storage hoppers and capacity of combines has increased, the time required to maneuver the machine next to the grain receiving wagon or truck and the grain transfer time have become a major component of the total harvesting time. Conventional combines have a grain hopper capacity of 250 to 300 bushels and unload auger capacities of 1.9 to 2.6 bushels per second.

The unload time of the hopper typically is about 2 to 3 minutes with the unload auger running at maximum speed and 1 to 2 minutes are taken to maneuver the combine into the optimum unload position next to the truck or wagon. Re-positioning the combine and running the auger at less than maximum speed are often encountered when topping off the truck or wagon which is receiving the grain. As modem combine harvesting capacities approach 3,000 bushes per hour, the unload cycle must be repeated every 8 to 10 minutes. Therefore, the total unload time or non-harvesting time is a significant reduction of total grain harvesting productivity. A grain capacity of about 600–650 bushels would permit the combine to harvest for about 1 mile, which would greatly reduce unloading cycles.

This productivity loss can be countered by a second operator utilizing a tractor and grain cart following the combine back and forth through the field to unload the on-board combine storage hopper without stopping the harvesting process. Alternatively, a combine with an integrated grain cart, as disclosed in applicant's U.S. Pat. No. 5,904,365 can be utilized to reduce the number of unload cycles and at least double the rate at which grain is discharged to the receiving vehicle.

Unloading combines into semi-trailer road trucks has become the prevalent practice as opposed to field wagons that were utilized in the past. These road trucks typically are parked at the side of the road and not in the field where the combine is operating. This necessary practice almost always creates an elevational difference between the two vehicles. These road trucks themselves also have widely varying heights. These two conditions create a big variation in the optimum elevation of the discharge point of the combine unloading system. Combine manufacturers have attempted to address this problem with ever-longer augers and higher fixed swing out arcs. There are, however, limits to both. This fixed point discharge point frequently ends up too high, too low, too far from the combine, or too close to the combine for optimum truck loading conditions. Such conditions require repositioning the combine with respect to the vehicle while it is unloading.

Existing combine unloading systems can unload from one side of the machine only. This frequently requires 180° turns by the combine to position it on the proper side to unload the grain into the road truck. It also means that while harvesting the combine generally only can be unloaded into a moving grain cart only while traveling along the left-hand side of the unharvested crop since access to the unloader would be precluded by the unharvested crop were the combine to be located the right of the crop.

When topping off or completely filling the truck or wagon, it is necessary for the operator to inch the combine forward or backward during the process. In addition to being cumbersome, the combine must be positioned close to perfectly parallel to the receiving vehicle or a stop and reposition is necessary. Moving the auger through its fixed arc frequently cannot solve the lack of paraller orientation.

An agricultural combine has multiple steering requirements. Precise control is needed as the row harvesting units such as a cornhead, are guided through the rows of grain. When the end of the field is reached, a tight turning radius is needed to proceed back across the field in order to harvest the crop immediately adjacent to the just-completed rows or round. Concomitant with its field performance, this large vehicle also must be controlled on the roadway at speeds of around 20 mph and around tight corners. Another steering associated problem is to turn multiple axle, heavily-loaded bogies with large tires in a tight radius while minimizing sliding the tires in the horizontal (particularly in the lateral) direction, which places high stresses in the suspension, piles up dirt in the field, and causes excessive tire wear.

Early attempts at an articulated combine are reported in U.S. Pat. Nos. 4,317,326 and 4,414,794. The design capacity is stated to be around 360 bushels. Its unloading mechanism is limited to one side of the combine and steering is accomplished only by articulation steering cylinders. U.S. Pat. No. 4,453,614 proposes a steering cylinder arrangement for an articulated combine. U.S. Pat. No. 4,204,386 proposes an articulated machine for gathering vegetables. U.S. Pat. No. 5,857,907 proposes a discharge conveyor having a secondary, variably extending conveyor attached to the terminal end of the discharge conveyor.

U.S. Pat. No. 6,012,272 (the '272 patent) discloses an articulated combine composed of a forward unit or bogey having an operator's cab, engine, grain harvesting assembly, grain transfer assembly, but no on-board grain storage; and a rear unit or bogey jointedly attached to the forward unit and having a steerable and powered wheel assembly, an on-board grain storage bin, and a grain off-loading assembly. Many of the industry long-felt, but unsolved needs regarding articulated combines are disclosed in the '272 patent. Basic improvements thereto are the subject of this application.

BRIEF SUMMARY OF THE INVENTION

One aspect of the present invention is a combine having increased on-board grain storage capacity. The combine includes a forward unit having an operator's cab, an engine, a grain harvesting assembly, a grain transfer assembly, and is devoid of an on-board grain bin. The combine also has a rearward unit jointedly attached to the forward section. The rearward unit has a powered wheel assembly, an on-board grain bin for receiving grain from the forward section grain transfer assembly, and a grain off-loading assembly.

Another aspect of the present invention is directed to a joint for a powered articulated vehicle, such as a combine for joining a forward unit to a rearward unit. The joint includes an upper frame member carried by the forward unit and having a recess on its lower side and a lower frame member carried by the forward unit, having a recess on its upper side, and being spaced-apart vertically below the upper frame member so that the recesses are in vertical registration. The joint further includes a shaft carried by the rearward unit and a bearing retainer assembly carried by the end of the shaft and disposed between the recesses. The bearing assembly includes an outer annulus surmounting an inner hub which hub is connected to the assembly also includes a pair of nibs carried by the outer annulus which nibs reside in the upper and lower recesses and which nibs are associated with tapered roller bearings so that the outer annulus co-twists with the shaft respect to the forward unit. Uniquely, the joint is stiff in the vertical plane through the longitudinal axis formed along the forward unit frame members and the rear unit shaft, i.e., around the pitch axis. It will be appreciated that the upper and lower frame members could be carried by the rearward unit and the shaft carried by the forward unit and the novel joint would function the same as with the configuration set forth above.

A further aspect of the present invention is an improved articulated combine comprising a forward unit connected by a joint to a rearward unit. The improvement for transferring clean grain from the forward unit to the rearward unit includes the rearward unit carrying an onboard grain bin and having a front wall that has a horizontal slot therein. The front wall retains a horizontally elongate grain transfer trough affixed thereto which trough is curved with its center of curvature congruent with the center of articulation of the combine. The trough is in communication with the bin via the slot. The forward unit carries a grain transfer assembly of a fixed elongate discharge chute that empties into the rearward unit trough while the forward and rearward units are being turned about the joint.

A still further aspect of the present invention is a grain unloading assembly for unloading clean grain from a combine grain bin, wherein a combine harvests grain and cleans it to provide the clean grain. Such grain unloading assembly includes a vertical flighted conveyor that is adapted to operate in either direction. Also included is a housing in which the vertical flighted conveyor is disposed. The housing is fitted at its top with a bin spout, a discharge spout, a moveable door that permits communication of the flighted conveyor either with the bin spout or with the discharge spout. A first opening at the bottom of the housing is covered with a moveable door for permitting grain in the bin to be moved into the housing for conveying by the flighted conveyor. A second opening at its bottom of the housing is for permitting clean grain to be passed into the housing from the combine.

Yet another aspect of the present invention is an unload assembly for unloading clean grain from a combine grain bin. This unload assembly includes a distal frame nested within a proximal frame. The distal frame is extensible from and retractable into the proximal frame. The distal frame has a discharge end for discharging grain. The proximal frame has a feed end for receiving grain from the grain bin and a distal end from which the nested distal frame extends and retracts. This unload assembly further includes a conveyor system that includes a first fixed pulley located at the feed end of the proximal frame. A second fixed pulley is located at the discharge end of the distal frame. A third fixed pulley is located at the distal end of the proximal frame. A fourth moveable pulley is disposed within the proximal frame intermediate the first and third fixed pulleys. The conveyor extends from the first pulley to the second pulley to the fourth pulley to the third pulley and back to the first pulley. A fifth pulley may be employed near the first pulley to increase the wrap angle of the conveyor belt around the first pulley. This arrangement permits the conveyor to extend as the distal conveyor extends and retracts as the distal conveyor retracts by movement of the fourth pulley.

Still a yet further aspect of the present invention is a straw and chaff spreader for mounting in association with a grain cleaner of a combine. This spreader includes a pair of generally horizontally-disposed, outwardly rotating, cleated conveyors disposed to receive straw and chaff discharged from the grain separator and cleaner of a combine.

A yet further aspect of the present invention is an airbag suspension for a vehicle having a vehicle frame having an axle (stub or through axle) extending therefrom. A longitudinal beam is affixed to the axle that carries at least one wheel. An airbag assembly includes an upper plate extending from the vehicle frame, a lower plate affixed to the longitudinal beam, and an airbag disposed between the upper and lower plates. The lower plate carries a pair of vertical blocks having vertical slots. A pair of cams is carried by the upper plate and rides in the vertical slots.

Another aspect of the present invention is a steering system for an articulated vehicle having a joint that connects a forward unit and a rearward unit and at least one articulation cylinder to provide a turning force at the joint. The steering system includes an operator speed and direction mechanism whereby an operator can direct the desired direction of the vehicle. A power source is provided for driving pumps adapted to drive motors and cylinders. The forward unit has tractive wheels (tired or tracked) powered by one or more motors. Each motor has a transducer for measuring its rotational speed and direction. The rearward unit has a pair of tractive endless tracks or tired wheels each powered by a separate motor. Each motor has a transducer for measuring its rotational speed. A programmable controller receives the rotational speed measurements (for overspeed control) and pressures from all of the transducers and operator steering commands from the speed and direction mechanism, and responds with suitable outputs. Actuators receive the controller outputs and adjust the output of each of the motors powering the rearward unit tracks/wheels.

A still further aspect of the present invention is an improved combine having a fuel tank, and which includes an overhead rail from which the fuel tank is suspended and an optional actuator connected to the fuel tank for moving the fuel tank forwardly and rearwardly. Desirably, though, the fuel tank can be moved forwardly and rearwardly by hand.

A still further aspect of the present invention is a method for articulating an articulated vehicle at a rest position wherein the vehicle is composed of a forward unit and a tracked rearward unit having a pair of powered tracks. The forward and rearward units are connected by a joint and an articulation cylinder. The method powers up only one track while simultaneously actuating the articulation cylinder.

Advantages of the present invention include a combine design, preferably an articulated combine, which enables grain storage capacity of between 500 and 1,000 bushels or more. Another advantage is an articulated combine which can unload clean grain to either side and which is controlled by a unique control system. A further advantage is a unique steering system for an articulated combine. These and other advantages will be readily apparent to those skilled in this art.

BRIEF DESCRIPTION OF THE DRAWINGS

For a fuller understanding of the nature and objects of the present invention, reference should be had to the following detailed description taken in connection with the accompanying drawings in which:

FIG. 6 is a sectional view taken along line 6—6 of FIG. 5 showing a plan view in greater detail of joint 22;

FIG. 7 is a sectional view taken along line 7—7 of FIG. 6;

FIG. 10 is an overhead view of the straw and chaff conveyor system fitted at the rear of the front unit of the novel combine;

FIG. 13 is a side cut-away view of the hydraulic nested grain off-loading assembly in its retracted position;

FIG. 14 is a side cut-away view of the hydraulic nested grain off-loading assembly in its extended position;

FIG. 15 is a partial side elevational view of a joystick used to control the clean grain transfer assembly depicted in FIGS. 13 and 14;

FIG. 16 is a top view of the joystick shown in FIG. 15;

The drawings will be described in detail below.

DETAILED DESCRIPTION OF THE INVENTION

The present invention provides basic improvements to the '272 patent articulated combine, which disclosed solutions to many problems associated with modem farming combines by providing a harvester that can unload readily on either side and to virtually any height road truck. The disclosed harvester retains the increased capacity of harvested grain carrying capacity from about 200–300 bushels in conventional combines to about 500–1,200 bushels utilizing the rearward-only grain bin, because the rearward unit has more capacity (space) than there is in a grain bin located over a front axle. This is important because the capacity of a typical road semi-trailer is 1,000 bushels. This means that the disclosed combine can fill an entire road truck from its on-board grain bin in a single unloading. Moreover, a unique, unloading system permits unloading of clean grain from the rearward grain bin unit out to either side of the combine. Such increased grain storage capacity is possible because the grain bin is located on the rearward unit, which permits a much lower center of gravity to be designed into the rearward unit.

In order to ensure that the extra weight can be easily maneuvered by the novel harvester, the rearward unit has powered and steerable wheels that are supported by a unique airbag suspension system. A new clean grain transfer assembly for transferring clean grain from the forward unit to the rearward cart bin unit also is disclosed. An improved two-axis joint interconnects the forward and rearward units. Straw and chaff from the harvesting assembly is discharged to either side by a unique dual conveyor system. "Wheels" or "wheeled" for present purposes includes both wheels that are fitted with tires (pneumatic tires) and wheels that are fitted with endless tracks.

Figure 1:
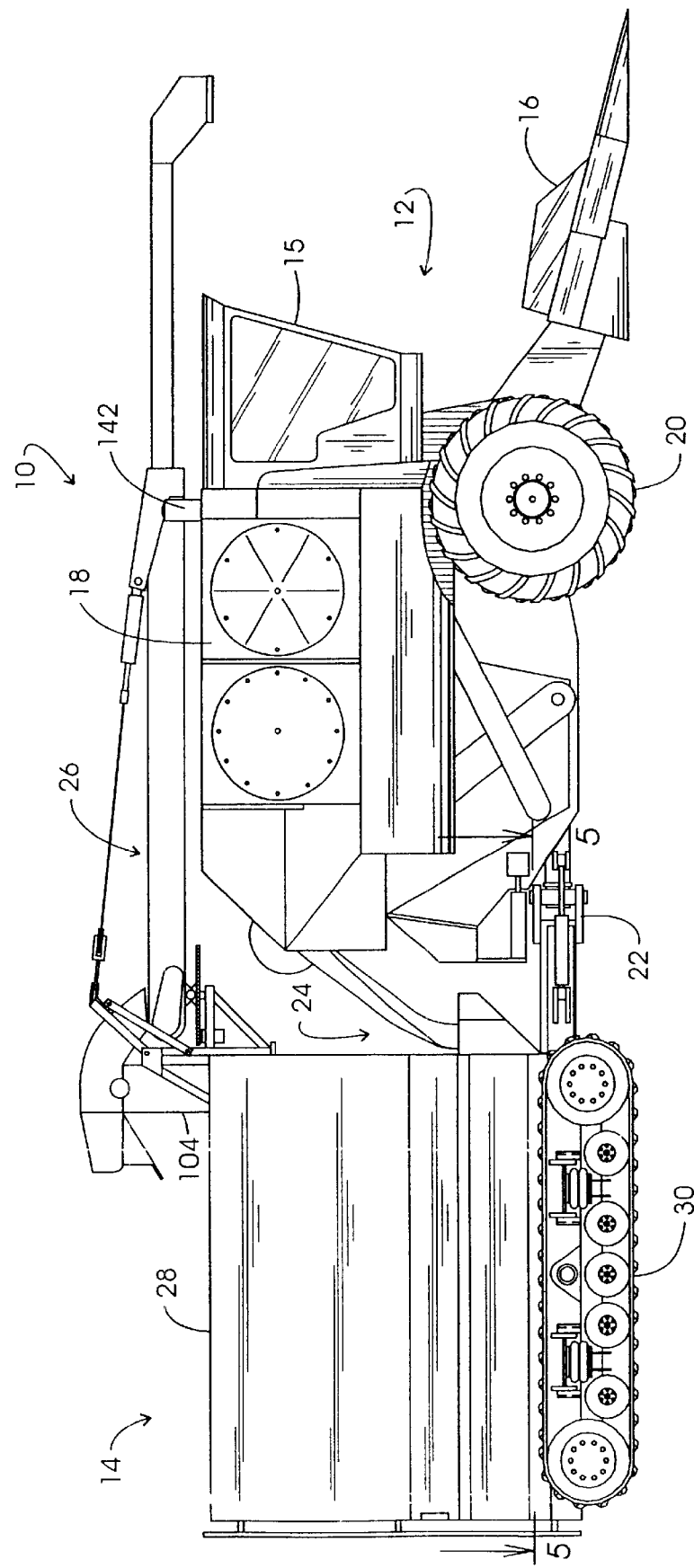
FIG. 1 is a side elevational view of the novel combine (or harvester) with, inter alia, extra large storage capacity, straw and chaff conveyor, novel joint, clean grain transfer ability, and unloading capacity.
Figure 2:
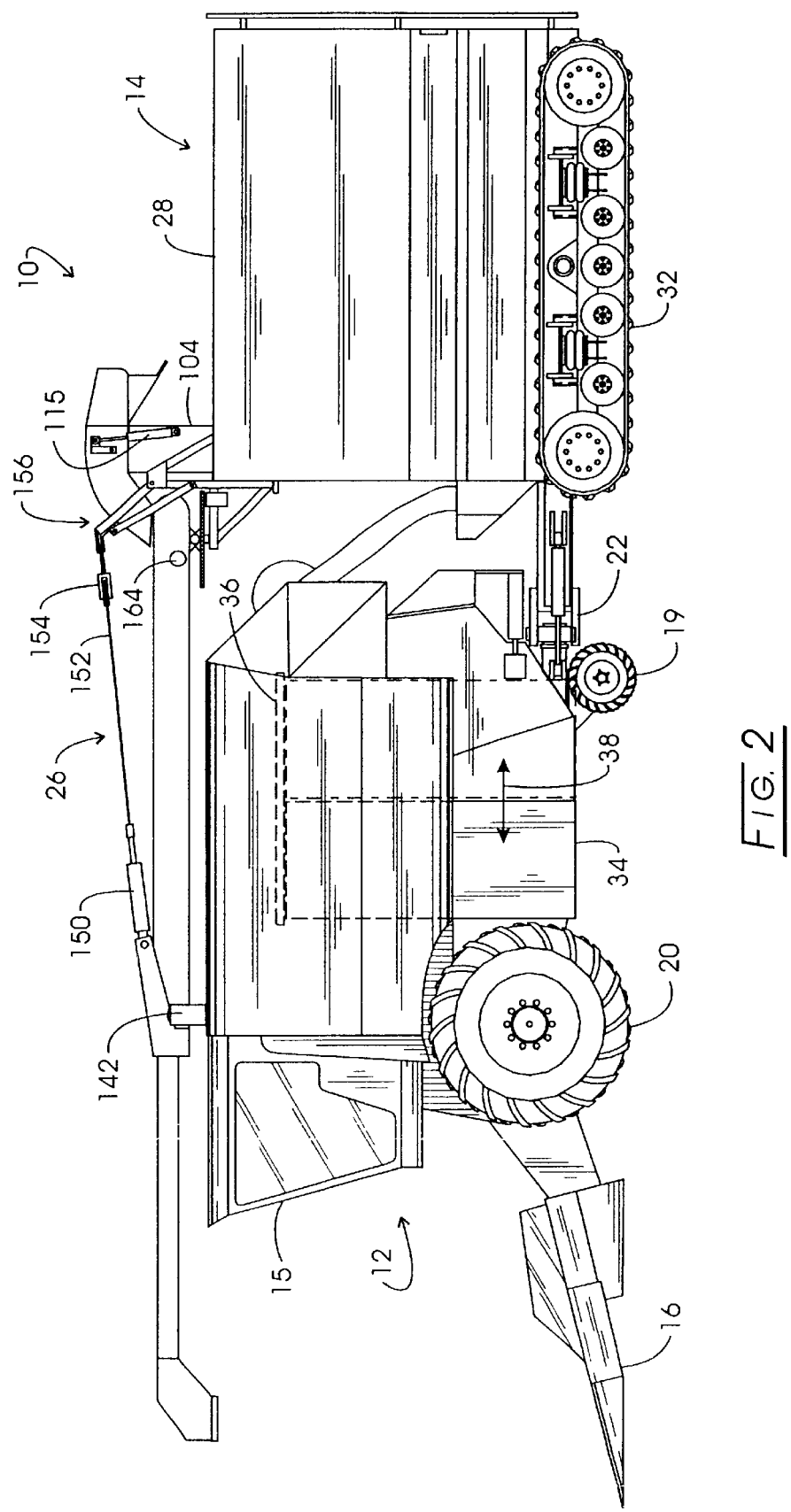
FIG. 2 is a side elevational view of the other side of the novel combine depicted in FIG. 1 fitted with caster wheels at the rear of the front unit.
Figure 3:
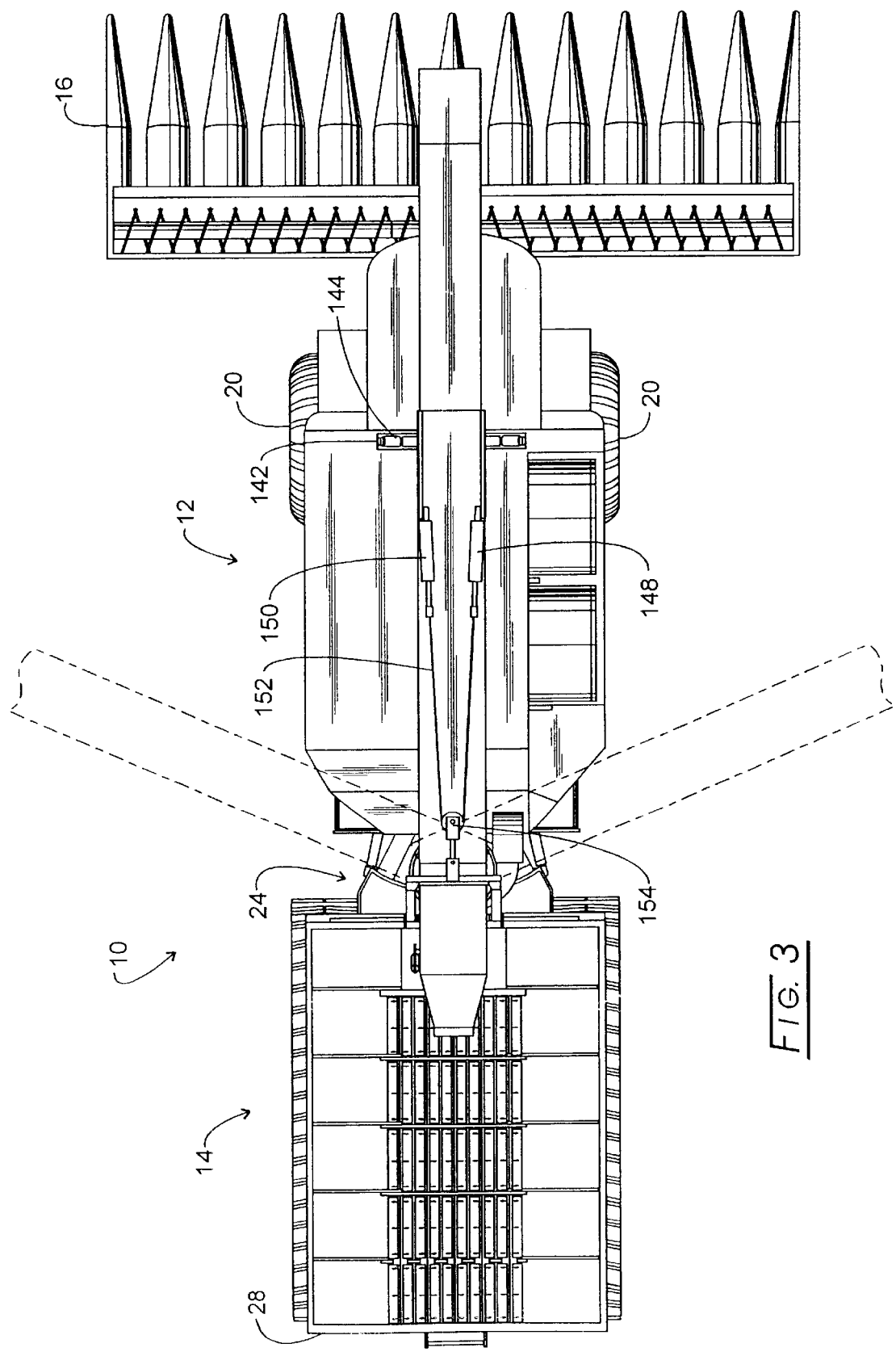
FIG. 3 is an overhead view of the combine depicted in FIG. 1.

Referring initially to FIGS. 1, 2 and 3, innovative combine 10 generally includes forward unit 12 and rearward unit 14. Forward unit 12 is seen to include cab 15 in which the operator is seated, cornhead or small grainhead 16, engine compartment 18 (two cooling fan air inlets shown in the drawings), and powered non-steerable wheel pair 20. In the alternative embodiment in FIG. 2, forward unit 12 is fitted with caster wheel pair 19 located at the rear of forward unit 12. Rearward unit 14 is interconnected to forward unit 12 via joint assembly 22 and clean grain is transferred from forward unit 12 to rearward unit 14 via clean grain transfer assembly 24. Rearward unit 14 is seen to include clean grain unloading system 26 in its stored position and in phantom in two possible raised unloading positions in FIG. 3, grain bin 28, and powered endless tracks 30 and 32. Use of a dual track system supporting grain bin 28 on rearward unit 14 contributes to the capability of grain bin 28 holding upwards to 1,200 bushels of grain. Providing the grain bin capacity only on rearward unit 14 translates into a lower center of gravity for grain bin 28 which also enables such higher storage capacity and provides more even weight distribution per axle. Importantly, at about 600–650 bushel capacity of grain bin 28, combine 10 could harvest, for example, a cornfield for one mile before unloading. Capacity in excess of requirement means that combine 10 can harvest for even greater distances before unloading.

As seen in FIG. 2, fuel tank 34 is carried suspended by rail 36 and is moveable from a forward to a rearward position as indicated by arrow 38. Movement of suspended fuel tank 34 ensures access to, for example, hydraulic lines and other components should such access be necessary, desirable, or convenient. Such fuel tank movement also enables weight shifting of forward unit 12, should such weight shifting also be necessary, desirable, or convenient.

Figure 4:
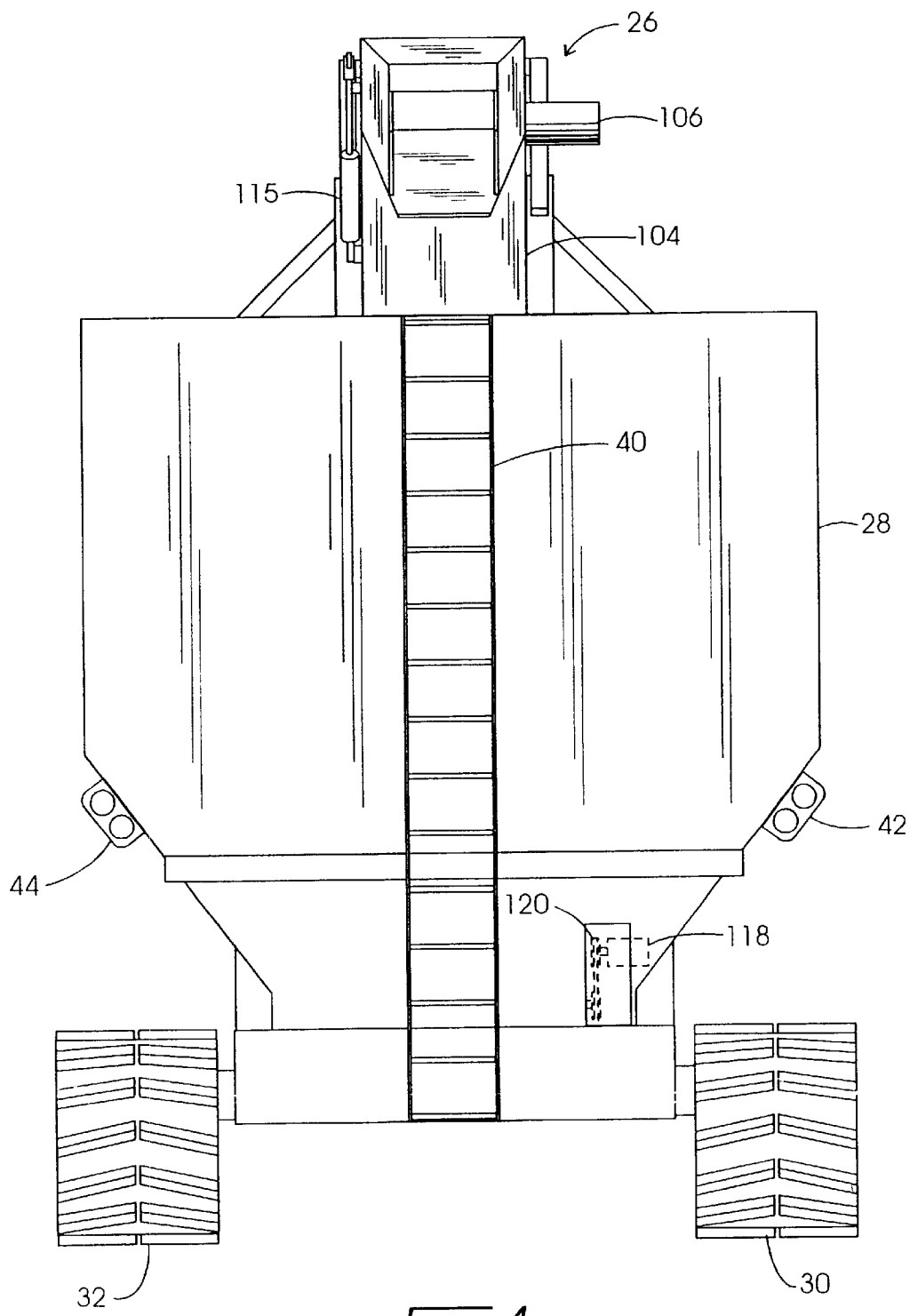
FIG. 4 is a rear view of the rear unit of the combine depicted in FIG. 1.

As seen in FIG. 4, grain bin 28 is fitted with ladder 40 for operator access to the interior of grain bin 28. Grain bin 28 also is fitted a pair of light arrays, 42 and 44, as the combine may traverse roadways in order to access field to harvest. Other items of interest in this rear view of the combine will be discussed later in connection with other features of the novel articulated combine.

Figure 5:
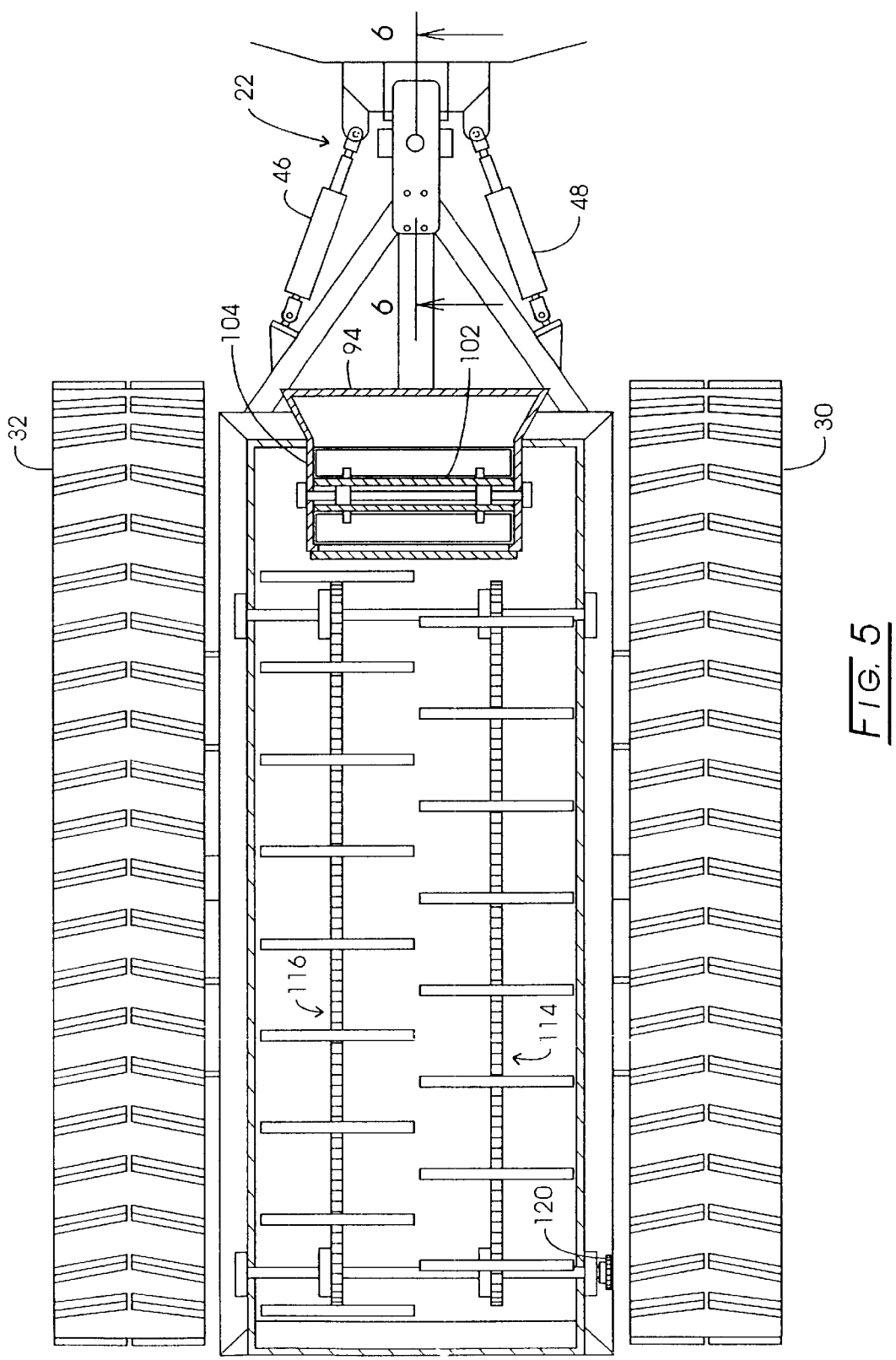
FIG. 5 is a sectional view taken along line 5—5 of FIG. 1.

Referring to FIGS. 5, 6 and 7 that illustrate joint 22, initially, it will be observed that a pair of steering cylinders, 46 and 48, are seen in FIG. 5 to connect forward unit 12 to rearward unit 14 of articulated combine 10. Such steering cylinders are conventionally used to assist in the steering of articulated vehicles and are provided here for such steering use in the present articulated combine design. Now, with respect to the two-axis joint, pipe 50 is attached to rearward unit 14 at one end and is constructed as a round pipe or structural tube. Shaft 52 extends from pipe 50 towards forward unit 12 and is inserted into bearing retainer assembly 60 which is inserted between upper frame member 54 and lower frame member 56. These frame members 54 and 56 are bolted to forward unit 12 via bolts 58a–d; although, other attachment means certainly can be envisioned. Each frame member 54 and 56 has an inner recess that confronts the corresponding recess in the other and into which is inserted bearing retainer assembly 60.

Bearing retainer assembly 60 has a pair of nibs or ears which fit into frame member 54 and 56 recesses and which ride on tapered roller bearing 62a–b to provide sideways movement to units 12 and 14 via pipe 50. Such sideways movement permits combine 10 to be steered. A hole penetrates through bearing retainer assembly 60 into which a reduced-diameter threaded end of shaft 52 fits and is secured via nut 64. Now, thrust bearings 66 and 68 fit into counterbores that adjoin the hole through bearing retainer assembly 60 and which thrust bearings permit shaft 52 to rotate and which, thus, enables units 12 and 14 to rotate with respect to each other. Such rotation permits units 12 and 14 to traverse uneven terrain during harvesting or other movement of combine 10. Note, however, that pipe 50 and shaft 52 are not permitted to move in a vertical direction due to the unique construction of joint assembly 22. Thus, a unique dual axis joint has been disclosed. It should be understood that the connection of joint 22 could be the reverse of that connection depicted in FIGS. 5, 6, and 7. That is, pipe 50 could be attached to forward unit 12 rather than rearward unit 14.

Figure 8:
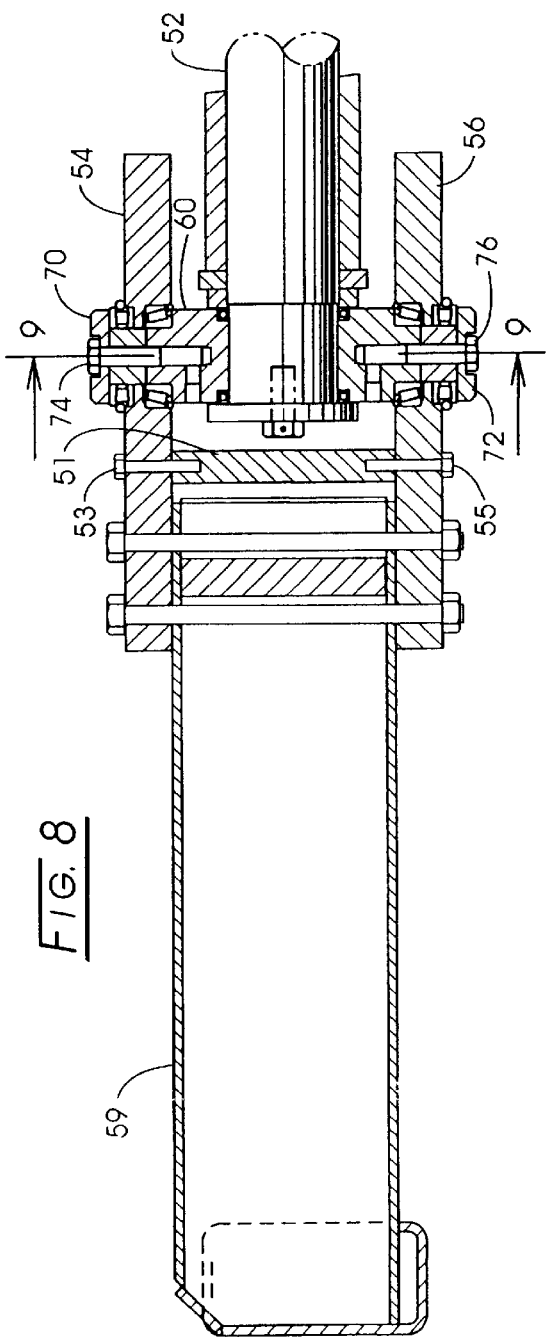
FIG. 8 is a sectional view like that taken along line 7—7, but of a preferred embodiment of the joint of FIG. 6.
Figure 9:
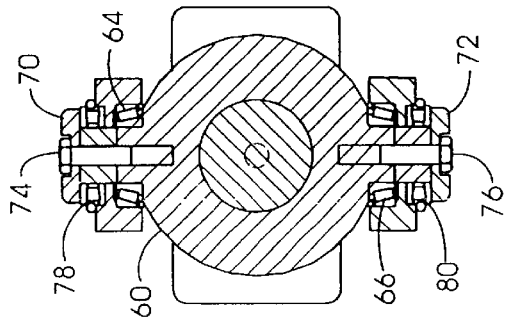
FIG. 9 is a sectional view taken along line 9—9 of FIG. 8.

A modified version of the joint depicted in FIGS. 6 and 7 has now been designed and is illustrated in FIGS. 8 and 9. It utilizes the features of joint 22 of FIGS. 6 and 7, except that additional thrust bearings have been added to take up the additional separational forces that joint 22 sees due to taped roller bearings 62 and 66. Also, the joint in FIGS. 8 and 9 has been rotated 180° so shaft 52 now is connected to forward unit 12, rather than to rearward unit 14 via pipe 50, as is shown in FIGS. 6 and 7. Also, frame members 54 and 56 are removably attached to frame member 59 that is connected to rear unit 14. Additionally, spacers 51 are held in place by threaded bolts 53 and 55, which fit through holes in frame members 54 and 56, respectively. The basic construction of the joint in FIGS. 8 and 9 is like that for joint 22, except that frame members 54/56 have apertures into which flanged plug assemblies 70 and 72 are placed and held securely by threaded members 74 and 76, respectively. Recesses adjacent the apertures in frame members 54/56 contain races into which thrust bearings 78 and 80, respectively fit and are retained by the flared heads of flanged plugs 70 and 72. Flanged plug assemblies 70 and 72 include spacers (not shown in the drawings) to ensure that tapered roller bearings 62 and 66 are not excessively pre-loaded when flanged plugs 70 and 72 are tightened and washers (not shown in the drawings) are provided for the flanges of plugs 70 and 72 to bear against when tightened.

Regarding to the novel two-axis joint as disclosed in the '272 patent, unique to joint 22 is that it is a "single point" joint. That is, joint 22 is designed to be only about a foot or so high. No other structural connection between forward unit 12 and rearward unit 14 is required by dint of the design of joint 22. That is not to say that other structural connection cannot be made between forward unit 12 and rearward unit 14, but that no other structural connection is necessary. In fact, it is a positive advantage that no other structural interconnection is needed between the two units because the combine designer has greater flexibility in locating equipment, lines, feeders, etc. because of the single point joint design disclosed herein.

Referring now to FIG. 10, the description will commence with the transfer of clean grain from forward unit 12 to grain bin 28 and will be completed with off-loading of the grain into, e.g., a semi-truck. In this regard, clean grain and straw and chaff separately exit from grain cleaner assembly 82 (which is quite conventional). The straw and chaff falls down onto dual conveyors 84 and 86 that are separately driven by hydraulic motors 88 and 90, respectively. Alternatively, conveyors 84 and 86 could be driven by a single motor with appropriate gearing, belts, or the like, providing for the movement of the non-driven conveyor either in the same direction or in the opposite direction from the driven conveyor. Conveyors 84/86 also can be seen in FIGS. 1–3 to be located above joint assembly 22. In normal operation where combine 10 is traveling through the field harvesting grain, conveyors 84 and 86 each rotate so as to throw the straw and chaff outwardly from combine 10. During a turn, it may be advantageous to not bunch up straw and chaff under the rear wheels of rearward unit 14, so both conveyors can be set to throw the straw and chaff to the side of combine 10 that is opposite the direction of the turn. Since conveyors 84/86 desirably are separately powered, they can be rotated in the same direction or in opposite directions. Regardless of the direction of their turning, conveyors 84/86 ensure that the straw and chaff will not fall down on joint assembly 22 nor bunch up directly underneath combine 10 for rearward unit 14 to traverse over.

Figure 11:
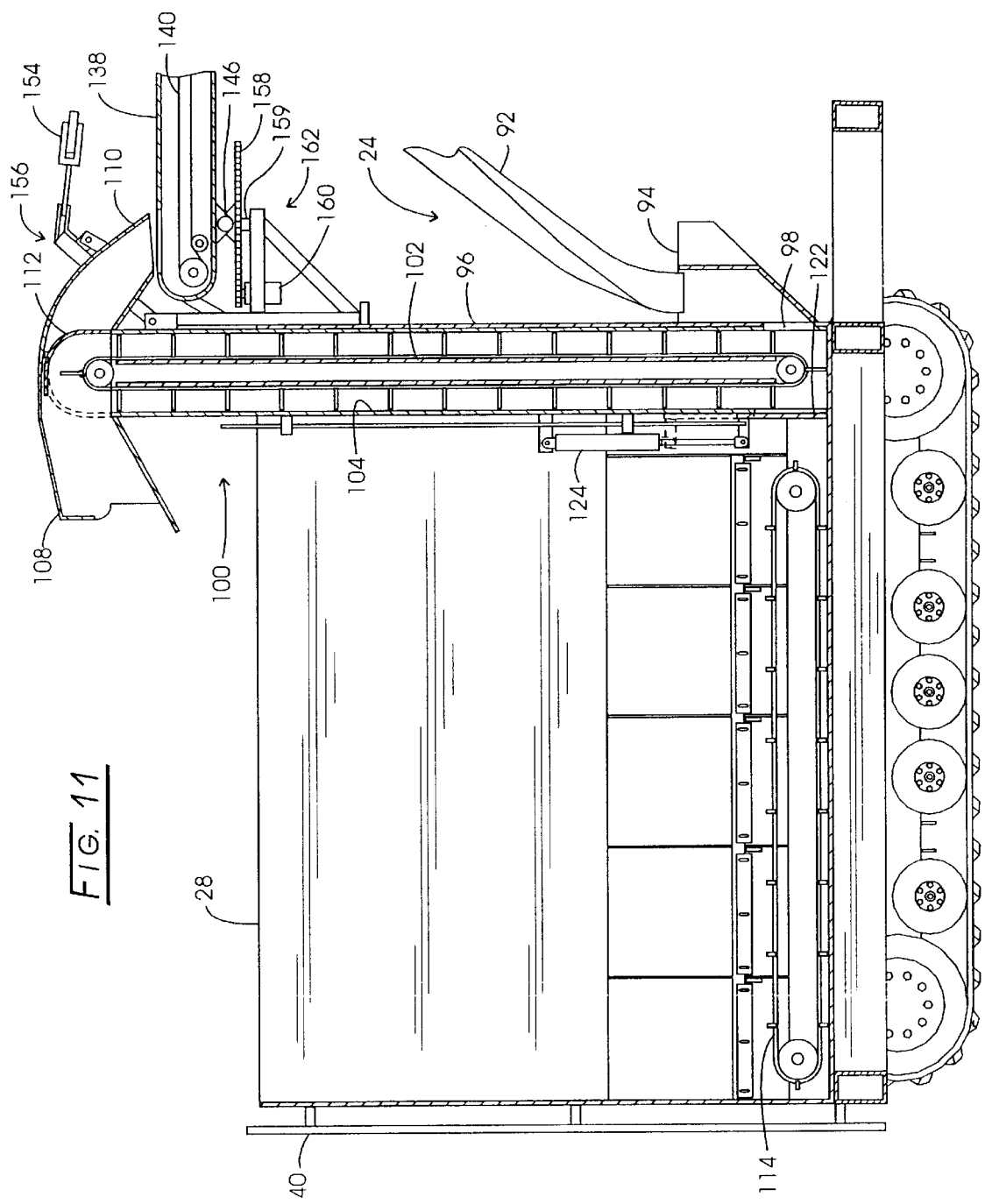
FIG. 11 is a side cut-away view of the rear unit of the novel combine showing the grain transfer system between the front and rear units and the grain handling system aboard the rear grain bin unit.

The clean grain from the grain cleaning operation aboard forward unit 12 travels to clean grain transfer assembly 24 (see FIGS. 1–3 and 11). Referring especially to FIG. 11, it will be observed that clean grain passes down fixed elongate discharge chute 92 into elongate horizontal trough 94 that is connected to the forward wall of grain bin 28. From FIG. 3, it can be seen that the front of trough 94 is curved (or arcuate) to match the radius of curvature of articulation of combine 10. Such curvature ensures that fixed chute 92 always will empty clean grain into trough 94 even while combine 10 is turning (articulating). Now front wall 96 of grain bin 28 has slot 98 that permits clean grain in trough 94 to be passed to the inside (or cavity) of bin 28. The design of clean grain transfer assembly 24 is simple in that gravity is used to feed the clean grain from forward unit 12 into trough 94 via chute 92. Gravity also ensures that the clean grain in trough 94 passes through slot 98 into grain bin 28.

The clean grain passing through slot 98 enters vertical conveyor system 100 that passes the clean grain into bin 28 and also to clean grain off-loading assembly 26. As such, vertical conveyor assembly 100 is central to proper grain handling within grain bin 28. To that end, vertical conveyor system 100 includes flighted (paddled) conveyor 102 disposed within housing assembly 104. Conveyor 102 is driven by hydraulic motor 106 (see FIG. 4) and its direction is reversible and its speed is variable. At the top of conveyor assembly 100 are a pair of discharge chutes, 108 and 110 (which will be described later). Moveable door 112 powered by hydraulic cylinder 115 (see FIG. 2) permits clean grain to be discharged either by chute 108, chute 110 or both with the direction of conveyor 102 being coordinated with the position of door 112. With door 112 in the position shown in FIG. 11, conveyor 112 would be set to rotate in the counterclockwise direction by motor 106 (the direction of rotation is given with respect to FIG. 11, as direction of movement is determined by the position of the observer). Grain entering housing 104 via slot 98 would be discharged into grain bin 28. When door 112 is moved into the dashed line position and the direction of conveyor 102 reversed, grain would be discharged through chute 110 into unload assembly 26, which will described in detail below. It is possible to unload bin 28 while harvesting as also will be described below. Due to all the grain being dumped into bin 28 through chute 110, top leveling augers also can be provided to even out the clean grain stored in grain bin 28.

To continue with the flow of clean grain, once clean grain enters bin 28, it is stored there until it is required to be discharged. Referring to FIGS. 3, 5, 11, and 12, the first step is clean grain discharge commences with a unique floor design that includes drag paddles 114 and 116 that are powered by hydraulic motor 118 (see FIG. 4) that can be accessed via door 120 at the rear of grain bin 28. Drag paddles 114/116 essentially create a fluidized bed of grain that is fed from bin 28 through moveable door 122 that is powered by hydraulic cylinder 124 (see FIG. 11) and into housing 104. It will be appreciated that augers or the like could replace drag paddles 114/116; although, the flatness of paddles permits bin 28 to have a flat floor which increases the grain capacity of bin 28. In order to prevent the grain in bin 28 from stopping the movement of drag paddles 114/116 and in order to meter grain to such drag paddles, adjustable inverted-V floor assembly 126 is stationed just above drag paddles 114/116 (see FIGS. 3 and 12). Moveable doors or the like could substitute therefor. It will be appreciated that each inverted-V (e.g., V 128) retains a pair of adjustable louvers (e.g., louvers 130 and 132) that can finely adjust the openings between each inverted-V. Such louver arrangement provides for precise metering of grain from bin 28 to drag paddles 114/116. Louvers 130/132 can be adjusted manually; although, hydraulic adjustment could be provided.

Now that drag paddles have pulled/pushed the clean grain into housing 104, if conveyor 102 rotated in a clockwise direction with door 112 actuated to the dashed line position (i.e., chute 108 closed and chute 110 open), then clean grain in bin 28 will be conveyed by conveyor 102 up through housing 104 and be discharged via chute 110 onto clean grain unloading system 26. Should combine 10 be harvesting field grain while off-loading is progressing, then not only will grain housed within grain bin 28 be off-loaded (unloaded), but so too will clean grain entering housing 104 via slot 98 from grain transfer system 24. Thus, the novel combine has the capability of harvesting and unloading grain concurrently. Once clean grain in grain bin 28 has been off-loaded, door 112 is moved to its position as shown in FIG. 11 and conveyor 102 reversed in its direction of travel to then throw clean grain back into bin 28.

Clean grain unloading system 26 (see FIGS. 2 and 13) includes nested conveyor assembly 134, which includes distal frame 136 with grain chute 137 nested within proximal frame 138. Housed within frames 136/138 is cleated (or flighted) endless conveyor belt 140. Nested conveyor assembly 134 rests on cradle 142 that is formed from a shaft (not seen in the drawings) and rollers, such as roller 144 (see FIG. 3). Cradle 142 permits the nested conveyor assembly 134 to move along its longitudinal axis with respect to cradle 142 when combine 10 articulates. Rotational power is not supplied to conveyor assembly 134 when no clean grain unloading is taking place so that it is in a float or relaxed mode; thus, permitting conveyor assembly 134 to be rotated by cradle 142 when combine 10 articulates. Chute 110 transfers clean grain through an aperture in proximal housing 138 directly above the pivot point, pivot assembly 146 (see FIGS. 13 and 14), for conveyor assembly 134 so that the transfer location does not change as the conveyor rotates from side to side during unloading.

Nested conveyor assembly 134 is lifted by pistons 148 and 150, which are attached to cable 152 that runs through snatch block 154 which in turn is connected to rearward unit 14 by frame assembly 156 (see FIGS. 2 and 3). Such lifting mechanism also has its pivot point in line with the axis of rotation of conveyor assembly 134 so that conveyor assembly 134 does not change height as it is rotated from side to side, such as is shown in phantom in FIG. 3. Such lifting mechanism's connection to rearward unit 14 is moment decoupled to prevent conveyor assembly 134 from twisting as it rotates by means of the universal attachment of snatch block 154 which is permitted to move in all three axes. Alternatively, rod end Heim joints could be placed at the ends of an adjustable rod in place of cable 152.

Referring to FIGS. 2, 11, 13, and 14, nested conveyor assembly 134 is rotated from side-to-side by wheel or sprocket 158 that is supported by shaft 159 for rotation of sprocket 158, a chain that encircles sprocket 158 (not readily seen in the drawings), and hydraulic motor 160 which pulls the chain through a small sprocket (also not readily seen in the drawings). Conveyor assembly 134 is supported by pivot assembly 146, which permits conveyor assembly 134 to be inclined upwards. The center of wheel 158 establishes both the axis of rotation and the axis of inclination of conveyor assembly 134. Pivot assembly 146 includes a shaft disposed vertically through its center hub, which shaft is supported by an outer hub that is tied to rearward unit 14 via structure 162. Additional structural stability and support (not shown in the drawings) for wheel 158 is provided by cam follower-type rollers that are disposed under the periphery of wheel 158 and tied to structure 162. This additional support can be helpful as the conveyor rotates which causes a torque load to be introduced into the center support shaft at various angles.

Endless conveyor 140 is driven by hydraulic motor 164 (see FIG. 2), which connects to drive pulley 166 (see FIGS. 13 and 14). From fixed drive pulley 166, belt 140 goes to stationary pulley 168 located in distal frame 136, back to moveable pulley 170, to fixed pulley 172, to idler pulley 174, and back to drive pulley 166. Note that moveable pulley 170 is located between fixed pulleys 166 and 172. As distal frame 136 is extended from proximal frame 138 by hydraulic motor 151 associated with pinion 153 and rack 155, pulley 170, which otherwise is biased inwardly, moves from a position such as is illustrated in FIG. 13 to a position such as is illustrated in FIG. 14. Hydraulic motor 151 is mounted at the distal end of proximal frame 138 along with pinion 153. Rack 155 is mounted at the proximal end of distal frame 136 and is driven by pinion 153 to extend/retract distal frame 136. Chute 137 in turn extends from its home position to an extended position so that clean grain can be unloaded, for example, into a waiting semi-trailer. Frames 136 and 138 preferably are shrouded or covered to aid in grain retention during operation of belt 140.

With respect to operation of clean grain unloading system 26, reference is made to FIGS. 15 and 16 which show the unique joystick control system of the '272 patent which can be adapted to control the present unloading system. Initially, joystick 200 is fitted with finger toggle switches 202, 204, 206, and button 208. The operator's fingers activate toggle switch 202 that causes unloading system 26 to move vertically up and down. Switch 204 conveniently is thumb activated and is an on-off switch for unloading system 26. Switch 206 is a combine inching switch; that is, it causes combine 10 to move slowly forward or backward to place spout 137 exactly where the operator desires. Such slow movement is known as "inching" in this field. Button 208 is a "home" button that means that unloading system 26 is returned to its stored position as shown in FIG. 3, for example.

Another capability of joystick 200 is that it can move forward, backward, and laterally left and right. These movements cause unloading system 26 to extend (say, forward movement of joystick 200), retract (backward movement), swing to the left (left movement), and swing to the right (right movement). Finally, joystick 200 is rotatable to control the speed of the belt 140 of unloading system 26.

Joystick 200 accomplishes the described movements of unloading system 26 by signaling electrohydraulic valves with a signal sent to manually adjustable flow control valves for, say, movement of unloading system 26 up/down, left/right, in/out, and home. Joystick 200 signals a proportional servo valve for on/off and conveyor speed (e.g., activates a linear electric servo that moves a pump swash plate). Joystick 200 signals the propulsion system of combine 10 in order to inch the combine forward or reverse by by-passing the normal operator speed control of the vehicle. It should be obvious that the novel combine takes advantage of the hydraulic system already in place in conventional combines and extends their use in order to power desirably the unloading system 26 and tracks 30 and 32. Other power means, of course, could be employed; however, hydraulic power tends to be more reliable.

In the unloading or off-loading mode, belt 140 always is actuated first and turned off last in order to minimize any plugging problems. Next, the direction of vertical conveyor 102 is reversed from the grain harvesting mode and its speed is increased. Door 122 is opened and grain fed by gravity to conveyor 102 until a sensor indicates that the amount of gravity fed grain slows down. At this point, drag paddles 114/116 are activated to feed conveyor 102.

Figure 17:
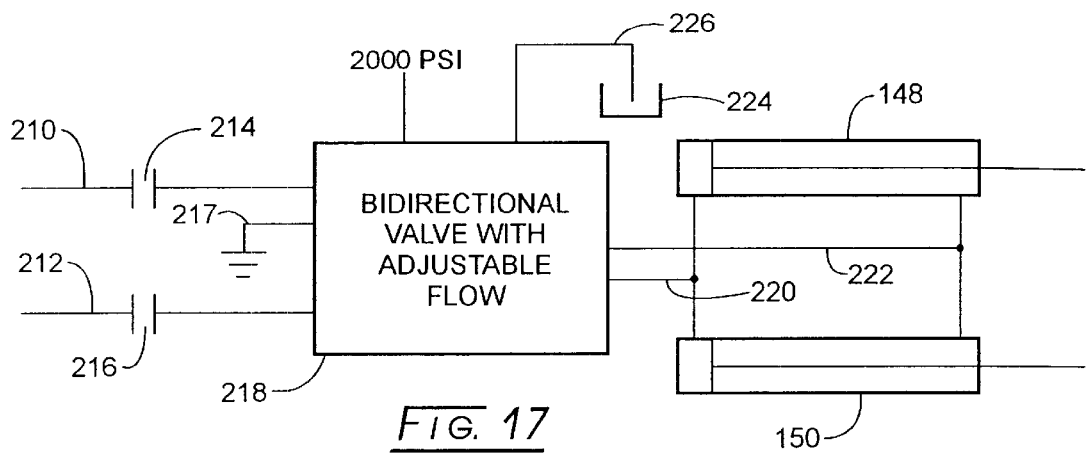
FIG. 17 is a schematic of the hydraulic vertical control for the clean grain transfer assembly of FIGS. 13 and 14.
Figure 18:
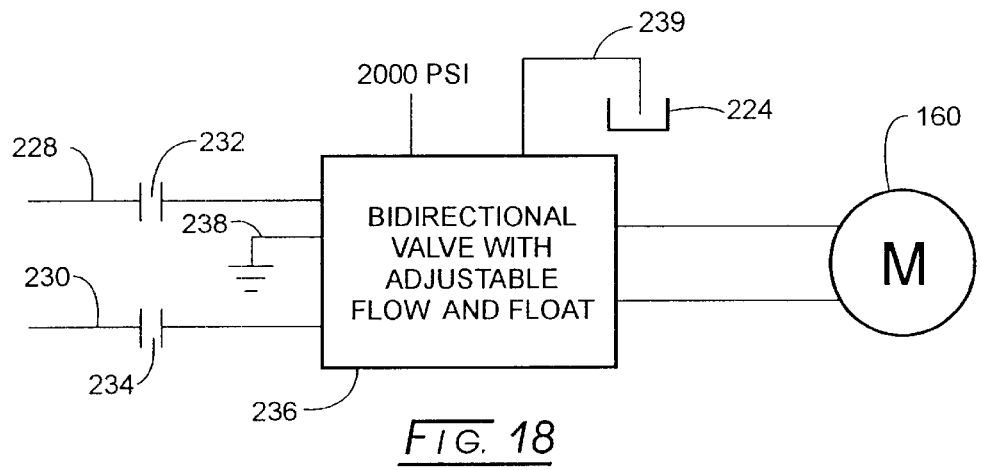
FIG. 18 is a schematic of the hydraulic swing control for the clean grain transfer assembly of FIGS. 13 and 14.
Figure 19:
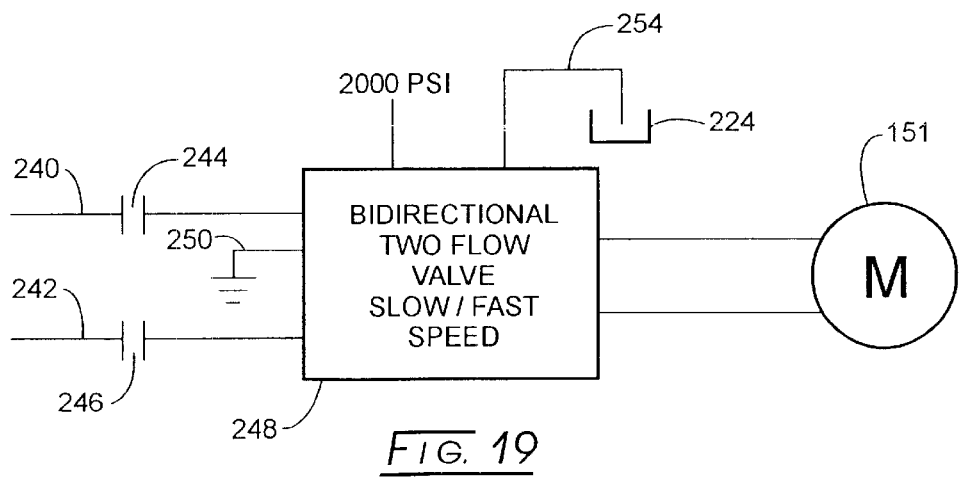
FIG. 19 is a schematic of the hydraulic telescoping control for the clean grain transfer assembly of FIGS. 13 and 14.

Implementation of such joystick movements of unloading system 26 is displayed in FIGS. 17–19. Referring initially to FIG. 17, lines 210 and 212 are connected to a source of voltage (say, 12 volts supplied by the combine). Contacts 214 and 216 are joystick 200 contacts for raising and lowering, respectively, conveyor assembly 134 of unloading system 26. Ground 217 is provided in conventional fashion. Upon closure of one of joystick contacts 214 or 216, bi-directional valve with adjustable flow 218 is fed hydraulic fluid at, say, 2,000 psi from a hydraulic pump which feeds rod and cylinder assemblies (pistons) 148/150 via lines 220 and 222 with oil returned to reservoir 224 via line 226. Assembly 134, then, raises and lowers unloading system 26 (conveyor assembly 134).

Referring to FIG. 18, lines 228 and 230 run to joystick contacts 232 and 234 which actuate bi-directional valve with adjustable flow and float 236 which actuates motor 160 for swinging unloading system 26 either left or right. Ground 238 and return line 239 to reservoir 224 are provided in conventional fashion. A rod and cylinder or other means could be substituted for motor 160.

Referring to FIG. 19, lines 240 and 242 run to joystick contacts 244 and 246 which actuate bi-directional two flow valve (slow/fast speed) 248 which actuates motor 151 for extending distal frame 136 from its nested position within frame 138. Ground 250 and return line 254 to reservoir 224 are conventionally provided. A rod and cylinder or other means could be substituted for motor 151.

Figure 20:
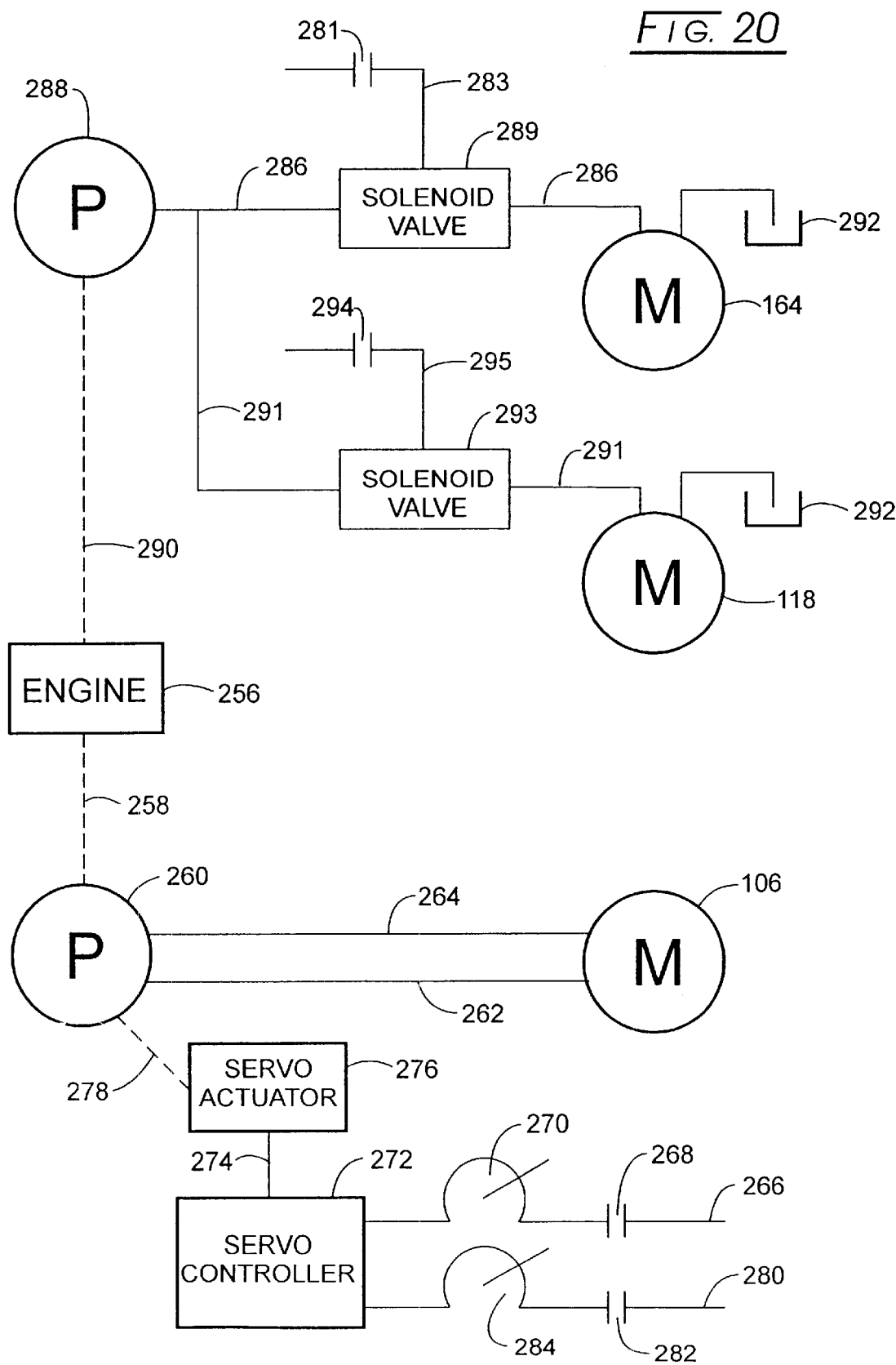
FIG. 20 is a schematic of the hydraulic speed control for the clean grain transfer assembly of FIGS. 13 and 14.

Referring to FIG. 20, the unload system speed control is shown. Specifically, combine engine 256 is connected via line 258 to pump 260, which is a variable displacement pump. Pump 258 is in fluid (oil or hydraulic fluid) communication with motor 106, which runs vertical conveyor assembly 102, via lines 262 and 264 that form a hydrostatic loop. Pump 260 is controller/actuated via joystick 200 as follows. Line 266 runs through on/off switch 268 and combine speed potentiometer 270 (actuated by joystick 200) to servo controller 272, which in turn is connected via line 274 to servo actuator 276 that is connected to pump 260 via line 278 for moving the swash plate of pump 260 to control the speed and direction of vertical conveyor assembly 102 via motor 106. Line 280 runs through on-off switch 282 and unload speed potentiometer 284 to servo controller 272 (also actuated by joystick 200). Now, line on/off switch 268 is on (and switch 282 off) when combine 10 is not in an unloading mode, i.e., the combine is idle or harvesting grain. Switch 282 is turned on (and switch 268 off) when the operator desires to off-load grain from combine 10. In this manner, the operator can control the speed of vertical conveyor assembly 102 via motor 106. It will be appreciated that the function of switches 268 and 282 could be combined into a single switch unit.

When the operator desires to off-load grain from grain bin 28, the operator also needs to control drag paddles 114/116 and belt 140. This is accomplished via on/off switch 281 (controlled by joystick 200) in line 283 that runs to solenoid-operated valve 284 that is disposed in line 286. Valve 284 is actuated by pump 288 that is powered by engine 256 via line 290. Now, line 286 from valve 284 runs to hydraulic motor 164, which runs belt 140, with the oil in line 286 returning to tank 292. On/off switch 294 (also controlled by joystick 200) in line 295 runs to solenoid-operated valve 293 that is disposed in line 291 that branches from line 286. Line 291 runs to hydraulic motor 118 that runs drag paddles 114/116, with the oil returning to tank 292. At this point in the description it should be noted that reservoir 224 is notated on the drawings as the reservoir for all hydraulic fluid circuits. Obviously, additional reservoirs could be used as is necessary, desirable, or convenient.

Figure 12:
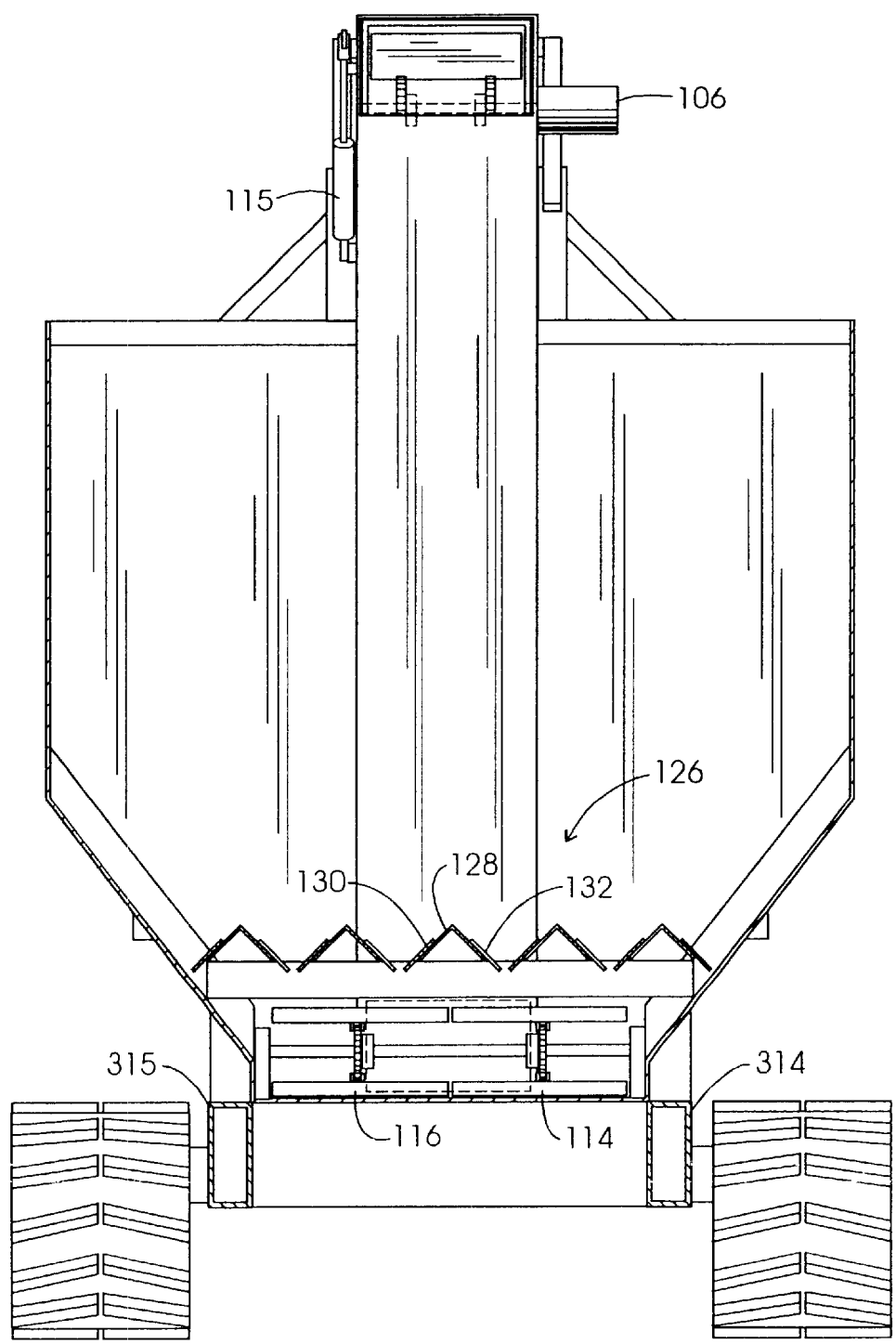
FIG. 12 is a rear cut-away view of the rear unit of the novel combine showing part of the grain handling system aboard the rear grain bin unit.
Figure 21:
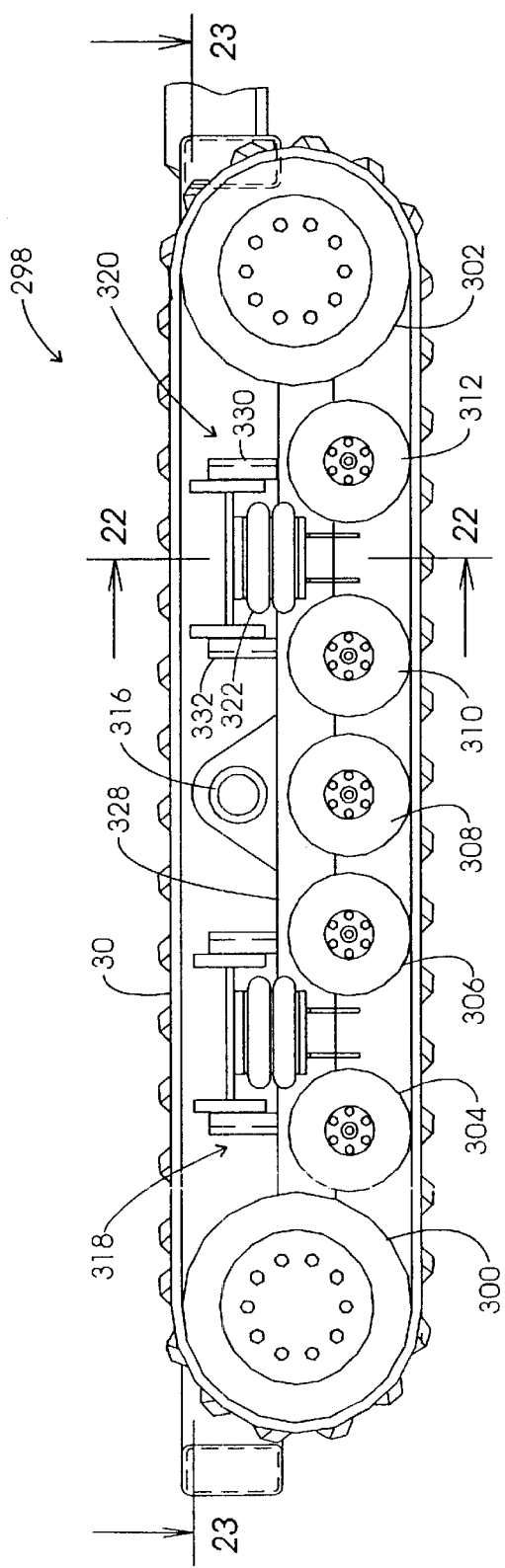
FIG. 21 is a side elevational view of the novel suspension system of the rear grain bin unit.
Figure 22:
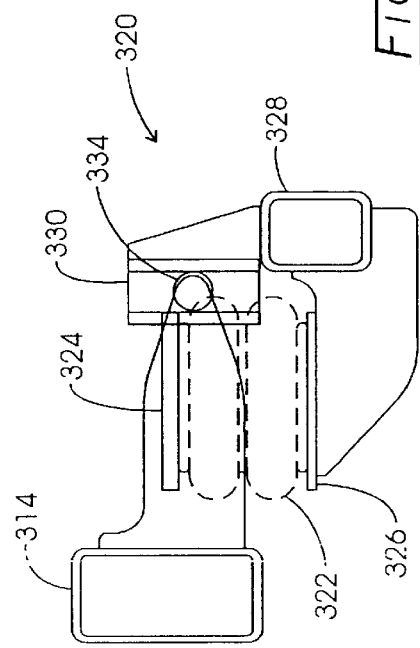
FIG. 22 is a sectional view taken along line 22—22 of FIG. 15.
Figure 23:
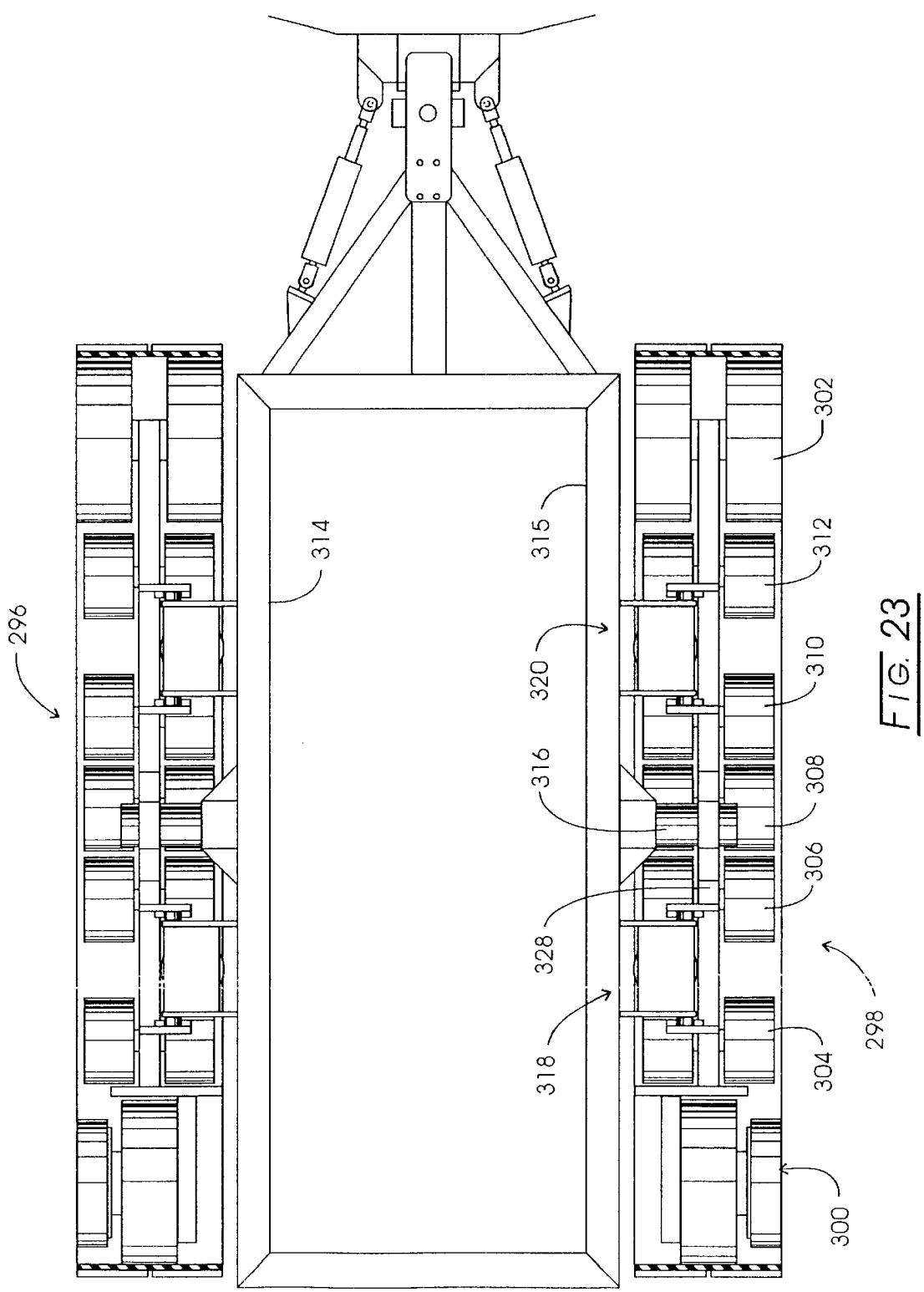
FIG. 23 is a sectional view taken along line 21—21 of FIG. 15.

The novel airbag suspension system now will be described with specific reference to FIGS. 21–23 for an endless track system; although, such airbag suspension system can be adapted for tired wheels (see FIGS. 24–27 and the description thereof) and for a variety of articulated vehicles (e.g., other farm vehicles, earth moving equipment (bull dozers, excavators, cranes), buses, mining equipment, etc.) in addition to combines. Endless track system 298 generally includes endless metallic sectioned or rubber traction belt 30 is seen to be mounted around drive wheel 300 (wheel and hydraulic motor assembly) and idler wheel 302. Additional intermediate idler wheels 304–312 are conventional in use, location, and function, and generally ensure contact of track 30 with the ground. Track system 298 is connected to frame member 314 of grain bin 28 (see FIG. 12) by stub axle 316. Another endless track system 296 (see FIG. 23) is disposed opposite track system 298, but will not be described in detail herein as it is a mirror image of track system 298. Track system 296 is supported by frame 315 as seen in FIG. 12.

Each track system 296/298 has a pair of airbag suspension systems, e.g., 318 and 320 airbag systems (nominal rating of, e.g., 10,000 pounds) for track system 298. Referring specifically to airbag system 320, airbag 322 will be seen to be retained by upper plate member 324 that is connected to frame member 314 and rests on lower plate assembly 326. Lower plate assembly 326 is connected to walking beam 328, which is supported by stub axle 316. Lower plate assembly 326 has a pair of upstanding forward and rearward members, 330 and 332. Each upstanding member 330/332 has a race or slot in which rides a cam follower, e.g., cam follower 334 for upstanding member 330. Cam follower 334 (and the other cams not visible in the drawings) are connected to upper plate member 324 are free to move vertically, but are restrained from moving horizontally. Thus, the cam followers dramatically reduce the large moment in the axle caused by the tracks sliding as combine 10 turns. Note should be taken that while stub axle 316 can be located at the longitudinal center of grain bin 28, it may be advantageous to locate it forward of such center of gravity so that grain bin 28 always is lifting up on joint 22. Also, walking beam 328 with its mounting only by stub axle 316 permits about a 12 inch rise and fall of each of its ends, i.e., wheels 300 and 302 can move ±12 inches to accommodate uneven terrain.

Figure 24:
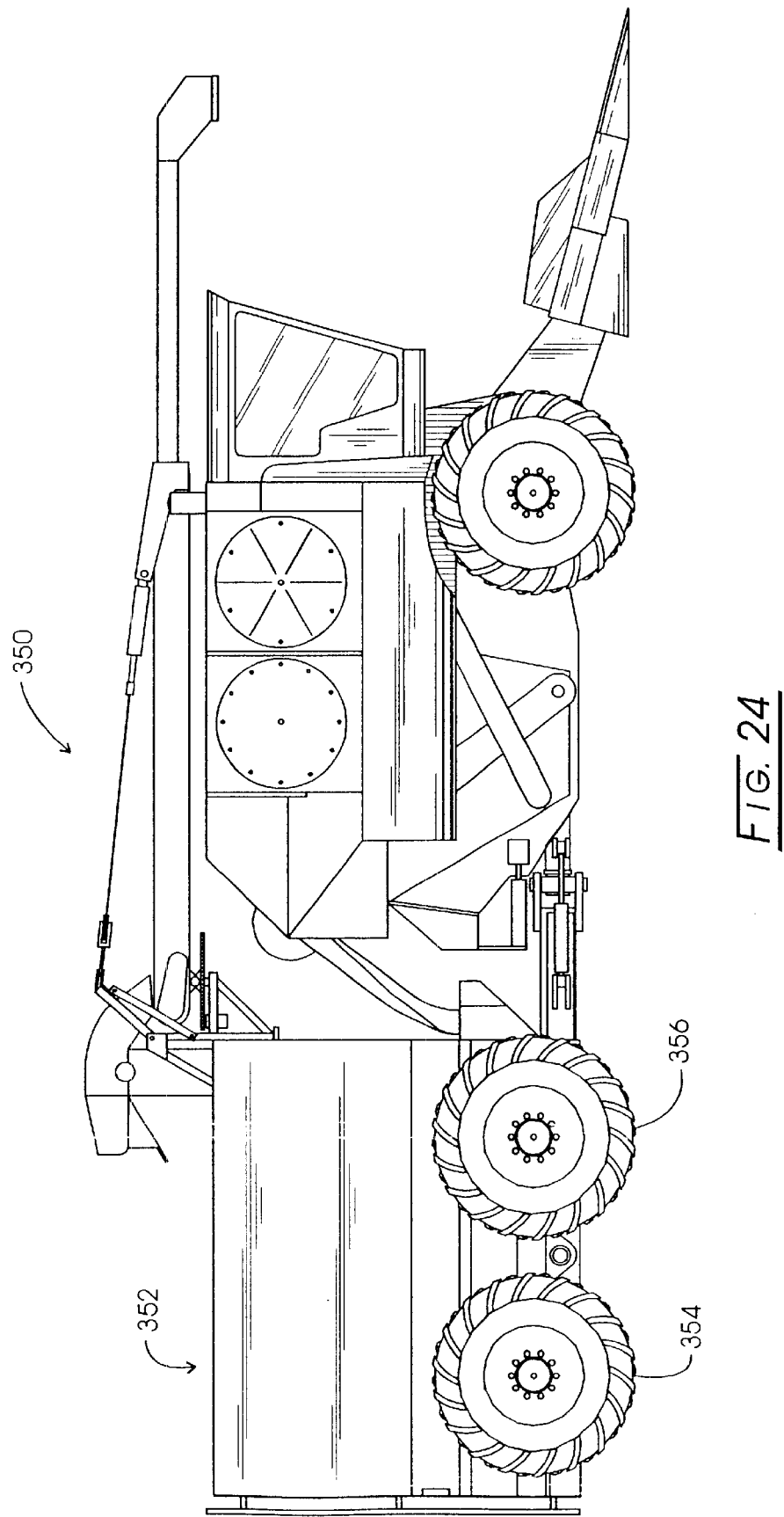
FIG. 24 is a side elevational view of a combine like that depicted in FIG. 1, except that the rear unit is wheeled rather than fitted with an endless track.
Figure 25:
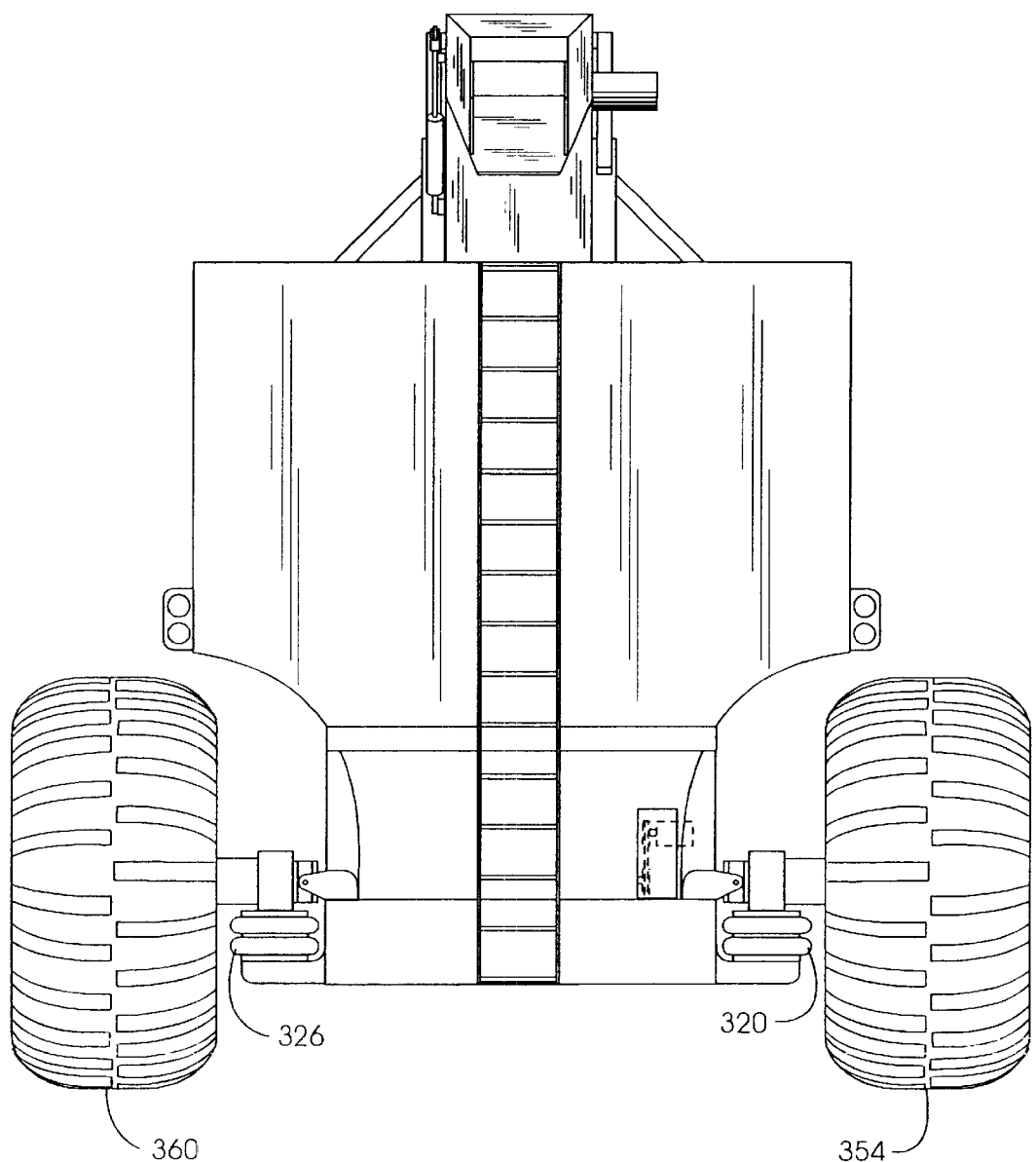
FIG. 25 is a rear elevational view of the combine in FIG. 24.
Figure 26:
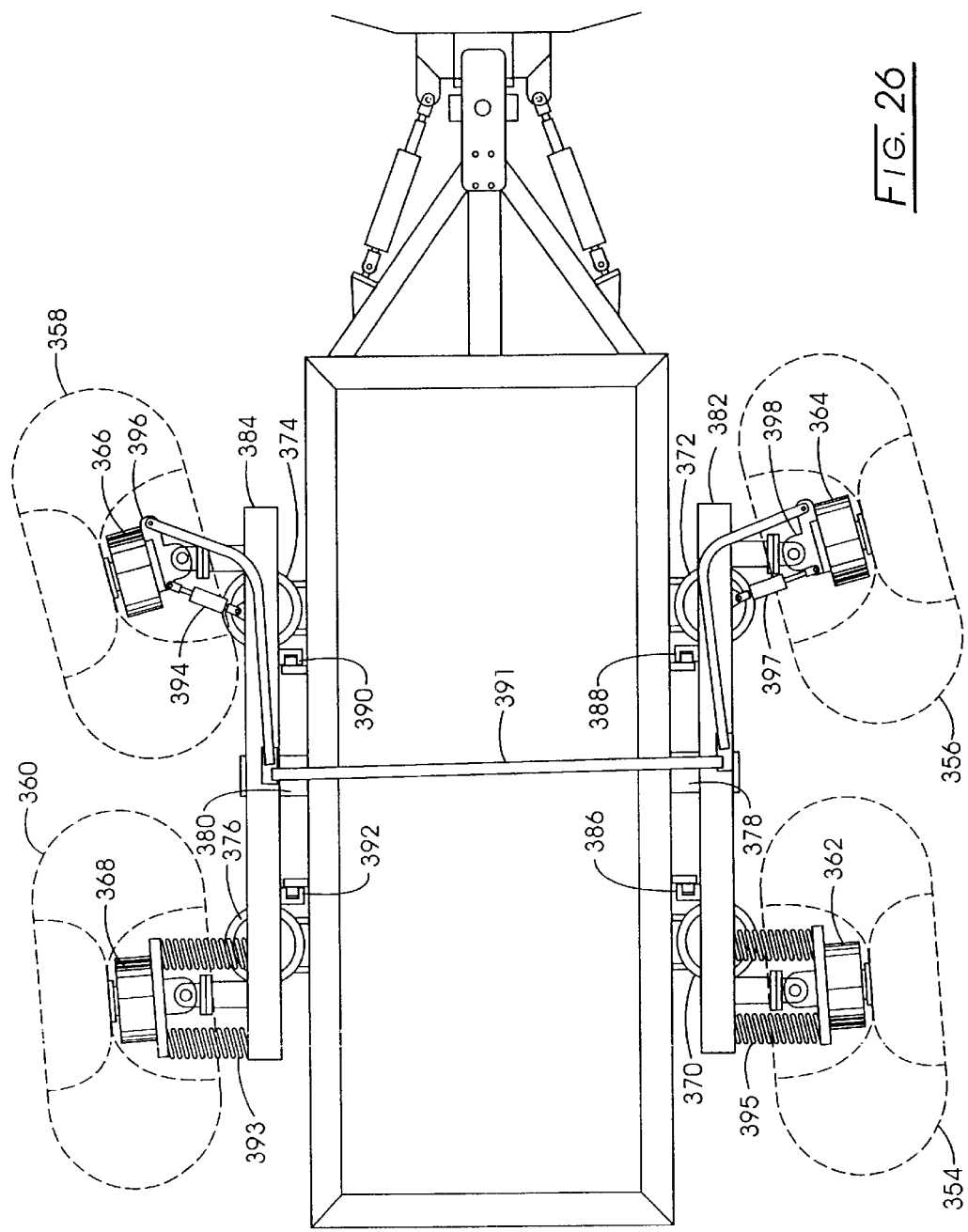
FIG. 26 is an overhead view of the combine in FIG. 24.

The same type of airbag suspension system can be adapted for tired wheels as was described for tracked wheels. Reference is made to FIG. 24 in this regard whereat articulated combine 350 is shown to have its rearward unit 352 supported by tired wheels 354 and 356 on one side, and on the other side by tired wheels 358 and 360 (see also FIGS. 25 and 26). Each tired wheel 354/356/358/360 is separately powered by a hydraulic motor 362/364/366/368, respectively. Each forward tired wheel also is designed to be turned about 15° by a hydraulic cylinder arrangement as seen in FIG. 26 wherein cylinder 394 is seen connected from beam 384 to knuckle 396 for tired wheel 358 and cylinder 397 is seen connected from beam 382 to knuckle 398. Cylinders 394 and 397 are hydraulically actuated and can be integrated into the steering system of combine 10.

Tired wheels 356 and 358 are joined together by tie rod assembly 391, which connects knuckle 396 with knuckle 398. Tie rod assembly 391 passes through grain bin 28 at about its center, that is, where beams 382 and 384 are attached to axles 378 and 380, respectively, in order to minimize the affect that the ups and downs that tired wheels 356 and 358 would generate as combine 10 traversed over uneven ground. Finally, spring assemblies 393 and 395 are mounted in associated with tired wheels 360 and 354, respectively, and bias tired wheels 360 and 354 to a neutral or straight-ahead configuration. Tired wheels 360 and 354 are permitted to rotate slightly during a turn of combine 10 and spring assemblies 393 and 395 return the wheels to a straight-ahead position.

Figure 28:
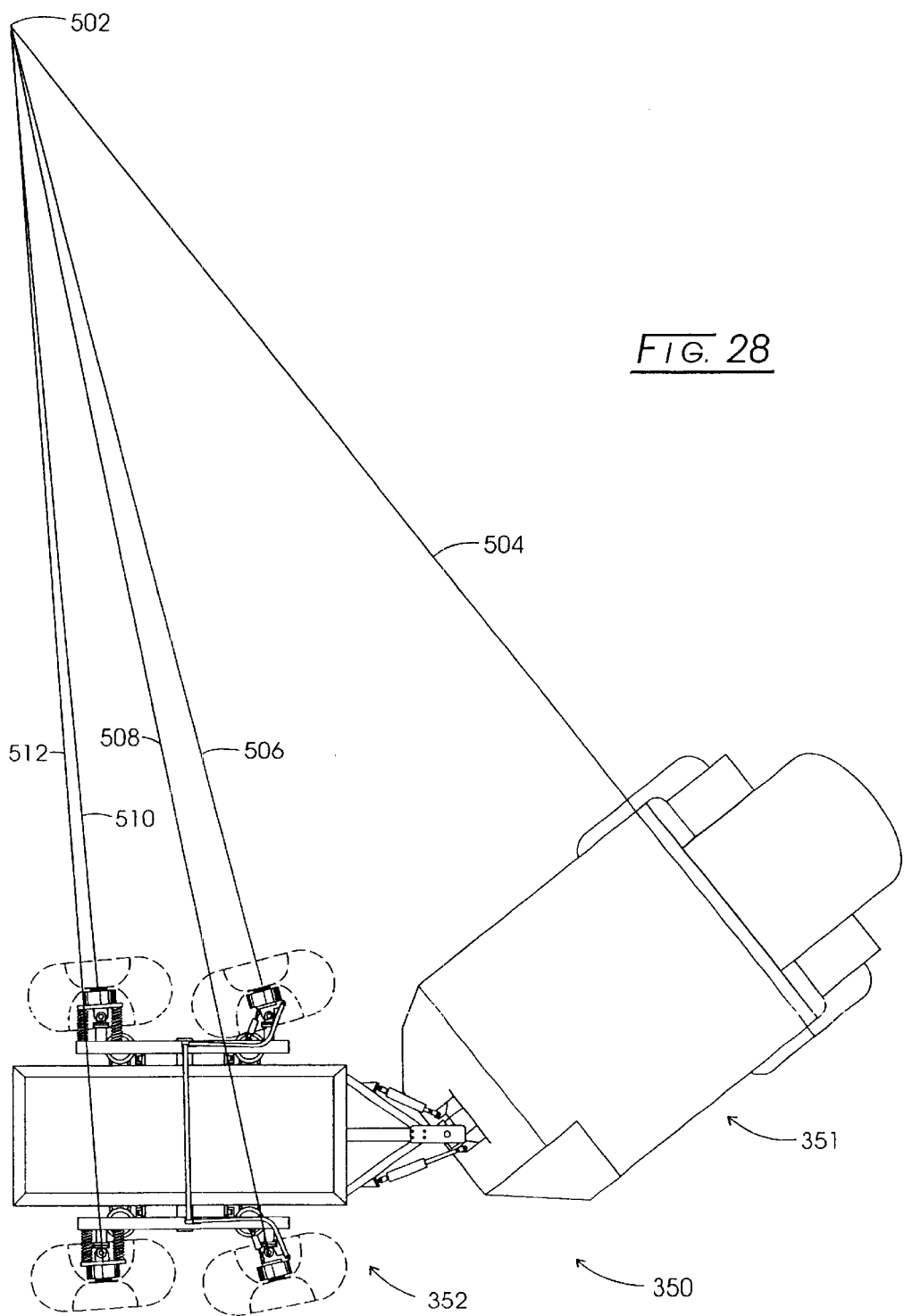
FIG. 28 is a simplified overhead schematic of the turning geometry for a wheeled rear unit embodiment of the present invention.

The reason for permitting rear tired wheels 354 and 360 to "free-wheel" rotate slightly during a turning of front tired wheels 356 and 358 is due to the geometry of turning an articulated vehicle. This can be seen by referring to FIG. 28 wherein an overhead simplified schematic of combine 350 is seen to include forward unit 351, having one set of wheels, and rearward unit 352, have two pairs of wheels. Now, during a turn of articulated combine 350, each set of wheels must be on an arc that meets at center 502 of the radius of the turn. The corresponding radii for each set of wheels are identified by radius 504 for the wheels of forward unit 351, radius 506 for tired wheel 358, radius 508 for tired wheel 356, radius 510 for tired wheel 360, and radius 512 for tired wheel 354. One consequence of the turning geometry is permitting rear tired wheels 354 and 360 to rotate slightly to conform to the turning radius, with spring assemblies 393 and 395 biasing them back into a straight position. Another consequence is that front tired wheels 356 and 358 can be turned along the same radius and still an acceptable turning scheme would be present; although, their radii are slightly different. Structuring a steering control system, then, accommodates the turning geometry illustrated in FIG. 28.

Figure 27:
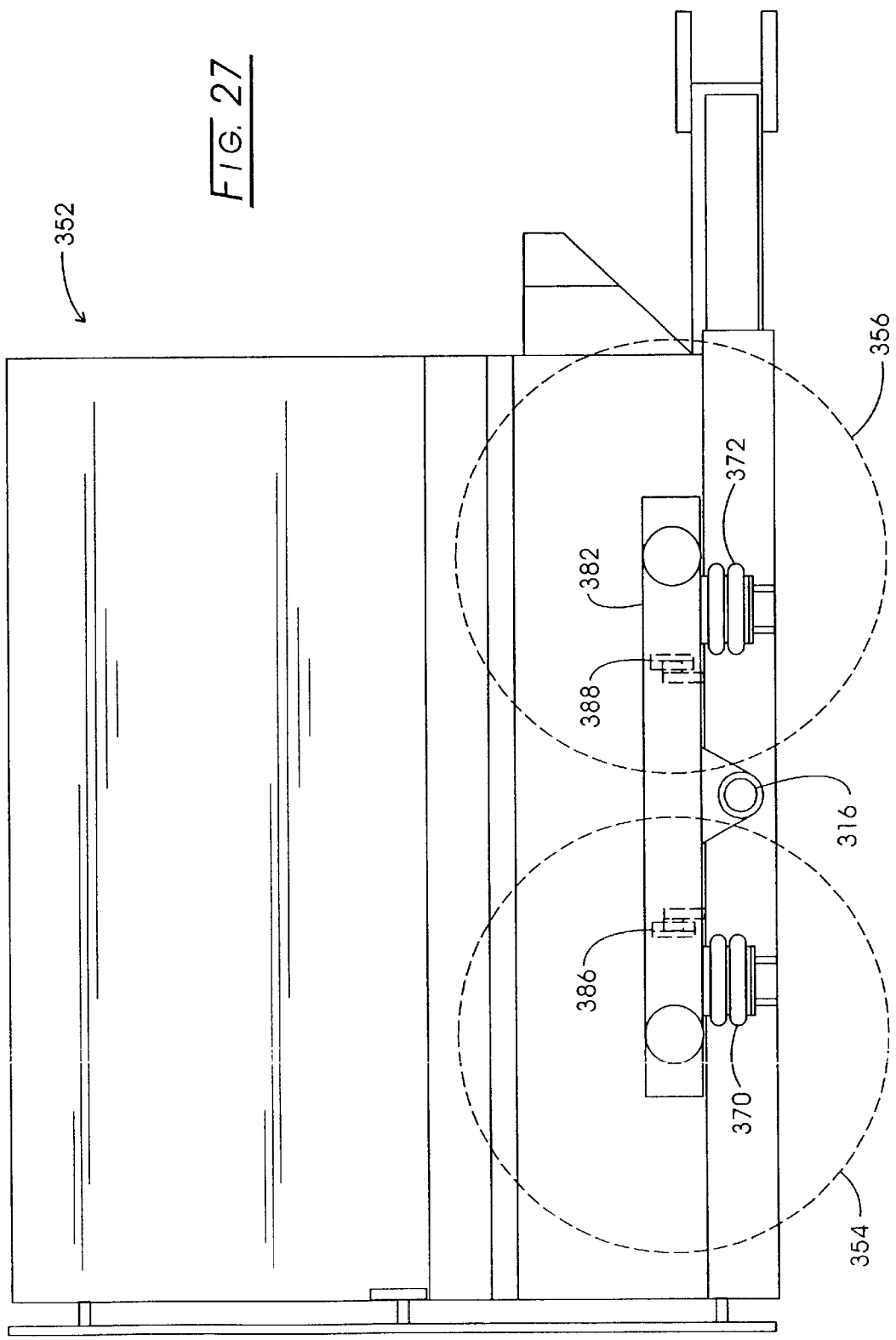
FIG. 27 is a partial sectional view of the suspension system of the combine in FIG. 24.

The airbag suspension system still is used; albeit in a slightly modified condition. That is, airbags 370/372/374/376 are retained by frames and utilize cam follower assemblies, 386, 388, 390, and 392, as described above. Stub axles 378 and 380 support walking beams 382 and 384, respectively, which in turn support the airbag assemblies. Thus, each tired wheel 354/356/358/360 has the ability to rise and fall, for example, ±12 inches, to accommodate uneven terrain. FIG. 27 illustrates such construction in greater detail and taken in conjunction with FIG. 26. The remainder of operation of articulated combine 350 is the same as described above with respect to articulated combine 10.

Now, with respect to steering and controlling articulated combine 10, several unique problems are encountered. Prior art articulated vehicles typically use hydraulic cylinders mounted across the articulation joint to produce steering force. The cylinders are controlled by a rotary valve mechanically connected to a steering wheel that is positioned by the operator to achieve the desired turn or vehicle direction. This system is used primarily on wheeled (tired) vehicles that have one axle in front of the joint and one behind the joint, such as an agricultural tractor; or two axles behind the joint, such as a mining truck. Typically, the wheels on the axle, which are powered, are connected together and receive power from a mechanical differential. The differential permits a speed difference to be created between the two tired wheels which speed difference is required to turn with a reasonable amount of force from the articulation cylinders. To initiate a turn in such an articulated vehicle, its also is necessary to slide or rotate the portion of the tires that are in contact with the ground or supporting surface. This generally is feasible since the contact patch or portion of the tire diameter in contact with the supporting surface generally is relatively small with respect to the diameter and width of the tires. Such tire sliding or rotating usually can be accomplished with a reasonable amount of force from the steering cylinders at the articulation joint.

In an articulated combine wherein the rear module is supported by endless tracks powered by individual motors, such as is disclosed in application Ser. No. 09/210,331, cited above, the steering forces are quite different from the tired vehicle just described. The endless tracks provide a much larger contact patch than do tires and, therefore, a much higher resistance to sliding or rotating them is encountered when a turn is initiated. The contact patch area also is elongated, which further increases the force required from the articulation cylinders to initiate a vehicle turn and to recover from a turn, which maneuver also requires sliding of the tracks laterally to position the vehicle in a straight alignment.

The steering forces are increased further when individual motors are used to power the tracks, rather than a single motor and a mechanical differential to interconnect the two tracks. When individual motors on each track are used, such motors typically receive hydraulic power from a common supply, whether such supply is one pump or two pumps that are interconnected at their output ports. The common supply is necessary in a conventional system to ensure that the motors will share the propulsion load since they are mechanically interconnected by the supporting surface under the vehicle. The common supply provides the same pressure to all motors, which means that each motor will produce the same torque or thrust when the system is in equilibrium and the vehicle is moving in a straight line. In order to initiate a turn, the steering cylinders must provide sufficient force to change the arc of travel of the tracks and establish an inside track and an outside track relationship that establishes a speed differential between the two tracks. The cylinders must overcome the natural tendency of the motors to run at the same speed and to share equally the tractive effort required to move the vehicle. The cylinders must force an articulation angle that forces a portion of the tractive load to move to the inside track, which causes the pressure to go down in the outside track due to its mandated increase in speed. Hydraulic fluid flow to the outside track motor increases immediately following the path of least resistance until the pressure in the two motors equalizes. This process occurs any time the articulation angle changes during a turn of the vehicle. The steering cylinders, therefore, must not only have sufficient force to slide or rotate the tracks, but also to create a backpressure differential between the two motors. The motors, thus, are resisting both the initiation of a turn and a recovery from a turn.

The described problem can be reduced by using the differential steering techniques in conjunction with articulation cylinders as disclosed in application Ser. No. 09/210, 331, cited above. An implementation of such improved technique is described below in connection with FIG. 29.

System Elements

A power source, which typically is an internal combustion engine disposed in forward unit 12 and which drives hydraulic pumps, which in turn function as a controlled source of power for hydraulic motors and cylinders.

A support and tractive means on the front unit (e.g., wheel pair 20) powered by a hydraulic motor driving through a mechanical differential; although, use of individually driven tracks and tires can be used.

An articulation joint (e.g., articulation joint assembly 22) that includes at least one articulation cylinder and rod assembly (e.g., hydraulic cylinder 46 or 48) to provide turning force wherein the cylinder is powered by a steering valve directing the flow from a hydraulic pump. The steering valve is controlled by the operator using a steering device, such as a wheel, or can be controlled by an automatic guidance system.

A support and tractive means for rearward unit 14 (e.g., endless track assembly 298). Usually, there are two such track assemblies separately and independently powered by individual hydraulic motors, which receive power from a pair of hydraulic pumps, each dedicated to a single hydraulic motor. Each motor includes a transducer or sensor that measures the rotational speed of the motor and provides that information to a control system.

A programmable controller (e.g., CPU), which receives steering and propulsion information from measurement transducers, performs preprogrammed or adaptive logic functions, and directs propulsion and steering elements to implement the vehicle maneuvers commanded by the operator or automatic guidance system.

An actuator, which receives commands form the programmable controllers and adjusts the output of the hydraulic pumps powering endless track assembly 298 (and a similar assembly on the other side of rearward unit 14) to cause the motors to execute the operator's desired vehicle maneuvers. These actuators typically are digital stepping motors that are adjusting the pump mechanism, which sets its output. In a typical hydrostatic pump, this mechanism is called a swash plate, which sets the stroke of the pistons that determines the output flow of the pump.

System Characteristics

Motor speed is determined by the oil flow rate from the pump.

Motor torque is determined by the pressure applied to it up to the setting on the relief valve, which opens at a preset pressure and allows hydraulic fluid to bypass the motor and flow back to the reservoir.

The load the motor is seeing at any point in time determines the pressure in the hydrostatic pump/motor loop. The swash plate in the pump is establishing a flow rate to the motor. The pump will attempt to always maintain that flow rate and the pressure rises or subsides as needed to keep the motor rotating at a speed to accept that flow.

It is, therefore, possible to make multiple motors load share or accept a disproportionate share of the total system load by controlling the pressure of the hydraulic fluid flowing to them. This assumes that traction will allow the load share or shift to occur, which dictates a speed limiting control loop since the individual pumps are not cross-connected. If the motor is speeded up by increasing the pressure to it in order for the motor to take on a greater load and the track powered by such motor cannot achieve sufficient traction, the motor will overspeed. The only controllable variable in the pump is flow by changing the swash plate. However, motor pressure/torque/speed can be controlled, assuming sufficient traction is available and the motor is sized adequately to overcome the load placed on it, by controlling the flow of hydraulic fluid the pump is trying to force through it.

System Objectives

To cause the motors to share the forward or reverse propulsion load within ±5% when the steering load on the articulation cylinders is less than a defined amount, say, 1,000 psi.

To assist the articulation cylinders to execute a turn whenever the cylinder pressure in either direction goes above 1,000 psi. Note: 1,000 psi is exemplary, but based upon results of testing the articulated tracked combine disclosed herein. Such figure may vary once further acceleration or starting on grade testing is undertaken. In this situation, the pressure reference may not be as stable as speed and likely will change with the load.

Figure 29:
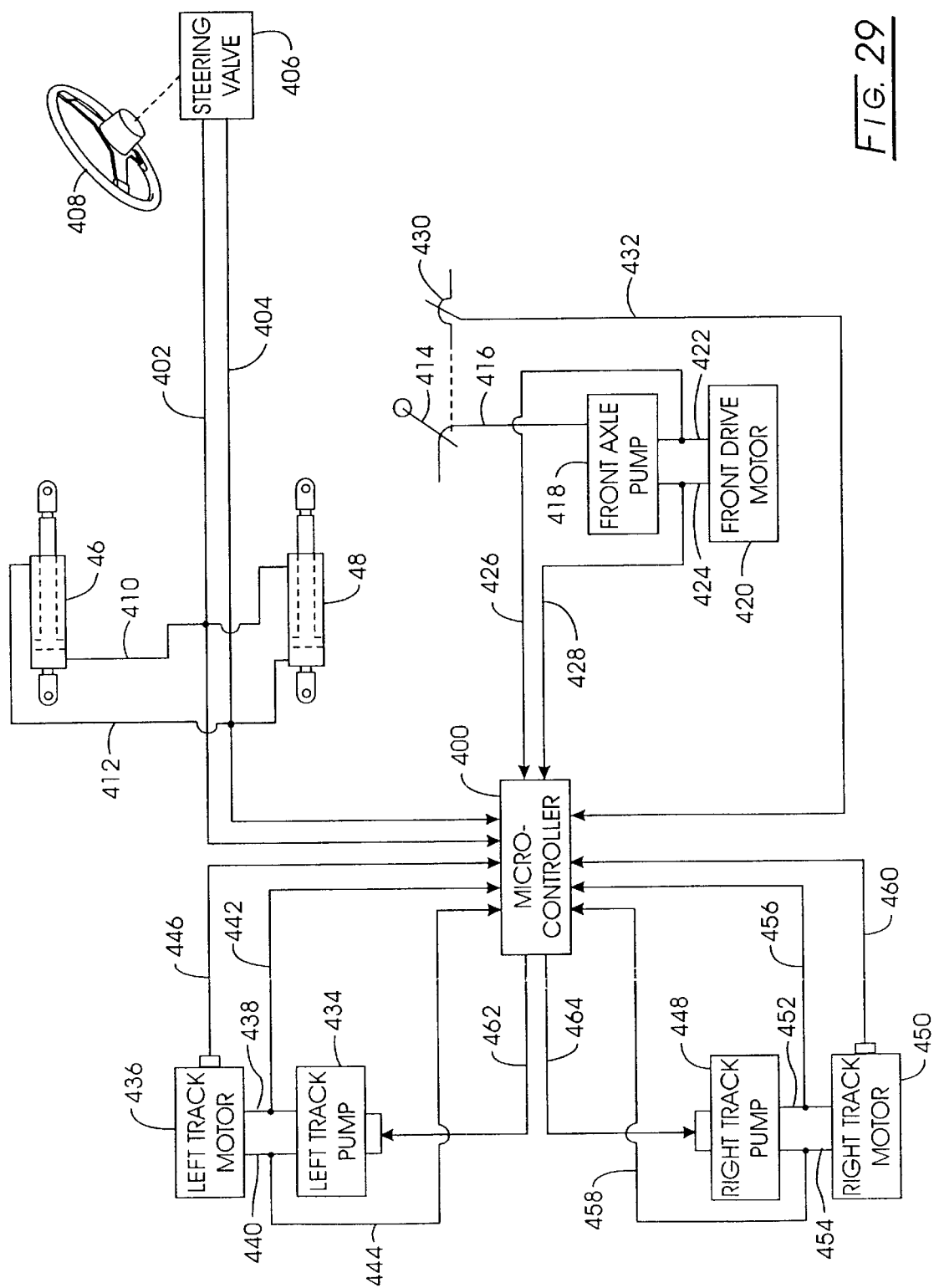
FIG. 29 is a schematic of the hydraulic steering system for the novel articulated combine.

The foregoing system elements, characteristics, and objectives are embodied in FIG. 29. Specifically, inputs to micro-controller 400 include left steering pressure signal 402 and right steering pressure signal 404 from steering valve 406, which is actuated by the operator rotating steering wheel 408. Signals 402/404 also are fed to left articulation cylinder 46 and right articulation cylinder 48 with lines 410 and 412 supplying the necessary interconnection between cylinders 46/48 and lines 410/412. Such interconnection is the primary steering mechanism for articulated combine 10.

The operator indicates the desired speed of combine 10 through lever 414 which is connected by line 416 to front axle pump 418 which drives front motor drive 420. Lines 422 and 424 interconnect pump 418 and motor 420 with lines 426 and 428 providing two more inputs to controller 400. Potentiometer 430 provides a reference signal via line 432 to controller 400. Left track pump 434 powers left track motor 436 via lines 438 and 440, from which signals 442 and 444 are sent to controller 400. Line 446 provides yet another input to controller 400 from left track motor 436. Right track pump 448 powers right track motor 450 via lines 452 and 454, from which signals 456 and 458 are sent to controller 400. Line 460 provides yet another input to controller 400 from right track motor 436. Finally, controller 400 communicates with left track pump 434 via line 462 and with right track pump 448 via line 464. All equipment is conventional in nature and design.

One condition that requires special attention for a tracked articulated combine is when the operator desires to commence movement (forward or reverse) from a standing or stop position with the steering wheel in a turning mode. Such initial turning movement requires tracks 30/32 to slide from rest, which requires a great amount of force/torque to overcome the consequent track friction with the ground. The above-described steering scheme can accommodate such conditions by initiating the turn with the articulation cylinders augmented by powering up only the outside track.

While combine 10 has been described as having non-steerable wheels, it should be appreciated that combine 10 can be designed to have steerable front wheels. Thus, steering of combine 10 can result from one or a combination of steerable forward unit wheels, articulation cylinders, and steerable (e.g., by speed differential or by wheel turning) rearward tracks (or tired wheels).

Finally, it should be appreciated also that some and/or all of the hydraulic motors, valves, pumps, and the like, can be replaced by pneumatic motors and associated equipment, electric motors and associated equipment, or by any other power generating device or system, so long as the design and operation remains with the precepts of the present invention.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. A joint for a powered articulated vehicle for joining a forward unit to a rear unit, which comprises:
   (a) an upper frame member carried by said forward unit and having a recess on its lower side;
   (b) a lower frame member carried by said forward unit, having a recess on its upper side, and being spaced-apart vertically below said upper frame member so that said recesses are in vertical registration;
   (c) a shaft carried by said rearward unit; and
   (d) a bearing retainer assembly carried by the end of said shaft and disposed between said recesses, and comprising:
      (i) an outer annulus surmounting an inner hub which hub is connected to said shaft with thrust bearings inserted between said outer annulus and said inner hub, whereby the inner hub co-rotates with said shaft with respect to the outer annulus;
      (ii) a pair of nibs carried by said outer annulus which nibs reside in said upper and lower recesses and which nibs are associated with tapered roller bearings so that said outer annulus co-twists with said shaft with respect to said forward unit;
      said joint being stiff in the longitudinal axis formed along the forward unit frame members and rear unit shaft.

2. The joint of claim 1, wherein:
   (e) said upper frame member (a) has a recess on its upper side and lower frame member (b) has a recess on its lower side, all of said recesses being in vertical registration;
   (f) a first flanged plug assembly inserted into said upper frame upper recess, said first flanged plug assembly having a flange that overlaps said upper frame upper recess into which said first flanged plug assembly is inserted, a thrust bearing being inserted in said upper frame upper recess adjacent said first flanged plug assembly and said flange; and
   (g) a second flanged plug assembly inserted into said lower frame lower recess, said second flanged plug assembly having a flange that overlaps said lower frame lower recess into which said flanged plug is inserted, a thrust bearing being inserted in said lower frame lower recess adjacent said second flanged plug assembly and said flange.

3. The joint claim 2, wherein an articulated steering cylinder is disposed on each side of said joint.

4. The joint claim 2, wherein said articulated vehicle is a combine.

5. The joint claim 1, wherein said upper and lower frame members are carried by said rearward unit, and said shaft is carried by said forward unit.

6. The joint claim 2, wherein said upper and lower frame members are carried by said rearward unit, and said shaft is carried by said forward unit.

* * * * *